(12) United States Patent
Schröder

(10) Patent No.: US 11,685,608 B2
(45) Date of Patent: Jun. 27, 2023

(54) APPARATUS FOR CONVEYING PRODUCTS

(71) Applicant: WEBER MASCHINENBAU GMBH BREIDENBACH, Breidenbach (DE)

(72) Inventor: Jens Schröder, Neubrandenburg (DE)

(73) Assignee: WEBER MASCHINENBAU GMBH BREIDENBACH, Breidenbach (DE)

( * ) Notice: Subject to any disclaimer, the term of this patent is extended or adjusted under 35 U.S.C. 154(b) by 517 days.

(21) Appl. No.: 16/832,835

(22) Filed: Mar. 27, 2020

(65) Prior Publication Data

US 2020/0307916 A1    Oct. 1, 2020

(51) Int. Cl.
| | |
|---|---|
| *B65G 21/12* | (2006.01) |
| *B65G 47/26* | (2006.01) |
| *B65G 47/64* | (2006.01) |
| *B65B 57/10* | (2006.01) |
| *B65B 35/24* | (2006.01) |
| *B65G 15/12* | (2006.01) |
| *B65G 39/16* | (2006.01) |
| *B65G 43/00* | (2006.01) |
| *B65G 47/76* | (2006.01) |

(52) U.S. Cl.
CPC ............. *B65G 21/12* (2013.01); *B65B 35/24* (2013.01); *B65B 57/10* (2013.01); *B65G 15/12* (2013.01); *B65G 39/16* (2013.01); *B65G 43/00* (2013.01); *B65G 47/26* (2013.01); *B65G 47/642* (2013.01); *B65G 47/766* (2013.01); *B65G 2201/0202* (2013.01); *B65G 2203/0233* (2013.01); *B65G 2203/0291* (2013.01); *B65G 2203/042* (2013.01); *B65G 2203/044* (2013.01); *B65G 2207/14* (2013.01)

(58) Field of Classification Search
CPC ........ B65G 21/12; B65G 43/00; B65G 47/26; B65B 57/10
USPC ....................................... 198/457.01, 457.03
See application file for complete search history.

(56) References Cited

U.S. PATENT DOCUMENTS 5,918,725 A * 7/1999 Farina ................ B65G 47/2445
198/415
6,152,284 A    11/2000 Sandberg et al.
(Continued)

FOREIGN PATENT DOCUMENTS

| DE | 29612787 U1 | 11/1997 |
|---|---|---|
| DE | 102008007768 A1 | 8/2009 |

(Continued)

OTHER PUBLICATIONS

European Search Report for related European Application No. 20166023.0; dated Aug. 28, 2020; 2 pages.

*Primary Examiner* — Douglas A Hess
(74) *Attorney, Agent, or Firm* — Dickinson Wright PLLC

(57) ABSTRACT

The invention relates to an apparatus for the single-track or multi-track conveying of objects along a conveying path extending in a conveying direction, wherein the conveying path for at least one track comprises at least one conveying device that takes over objects at the input side from a functional unit connected upstream and that transfers objects at the output side to a functional unit connected downstream; and wherein the conveying device as a whole and/or in an output-side end region is adjustable transversely to the conveying direction by means of an adjustment device such that the transverse position of objects to be transferred is changed within the respective track.

42 Claims, 15 Drawing Sheets

(56) References Cited

U.S. PATENT DOCUMENTS

Figure 1:
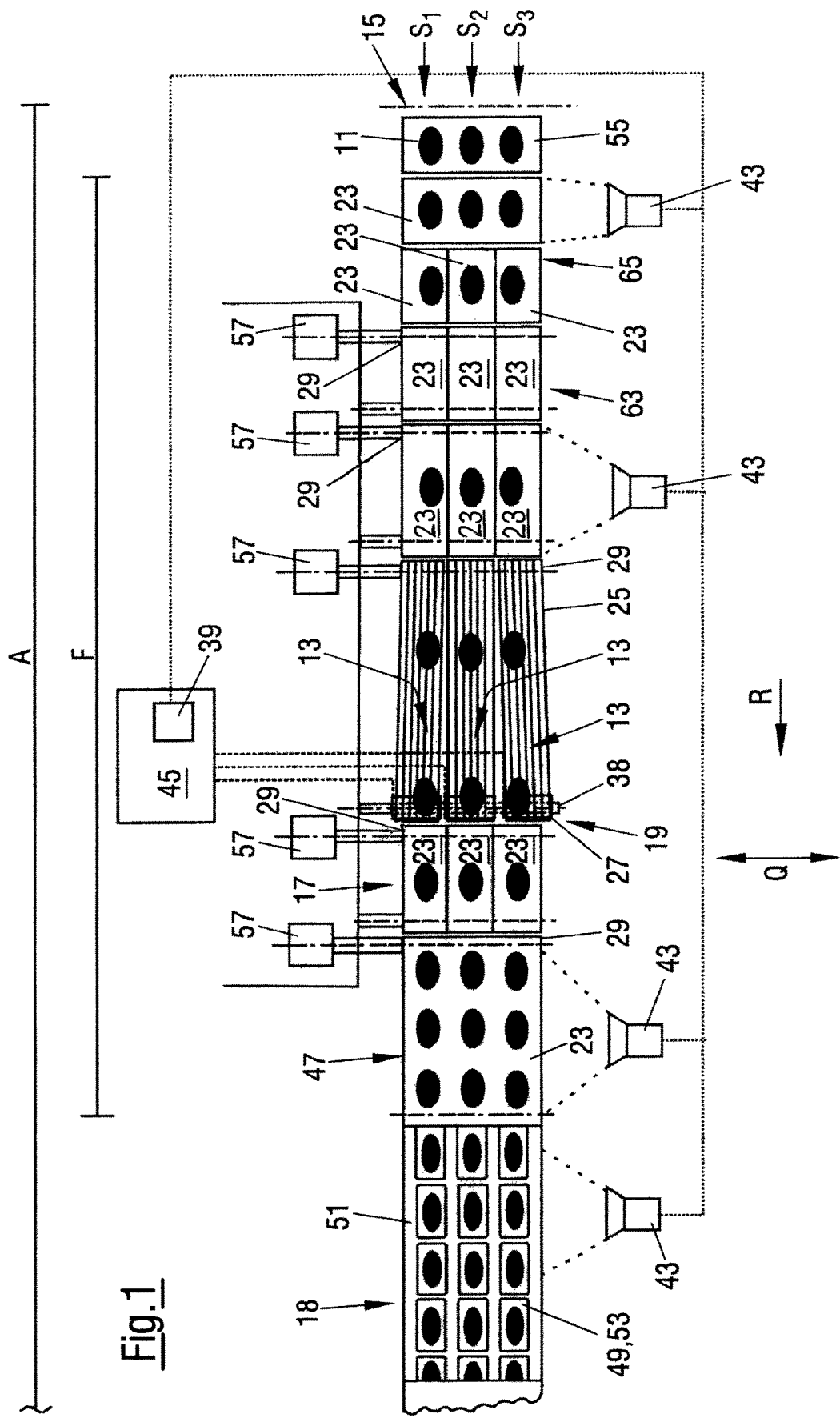

| | | | | |
|---|---|---|---|---|
| 7,380,650 B2* | 6/2008 | Gamberini | ............. | B65G 47/71 |
| | | | | 198/445 |
| 7,404,478 B2* | 7/2008 | Weber | ..................... | B65B 25/06 |
| | | | | 198/457.03 |
| 8,955,664 B2* | 2/2015 | Lim | ..................... | B65G 47/648 |
| | | | | 198/370.1 |
| 9,265,261 B2* | 2/2016 | Haas | ..................... | B65G 39/16 |
| 9,315,339 B2* | 4/2016 | Gaillard | ................ | B65G 47/34 |
| 9,809,401 B2* | 11/2017 | Mayer | ................. | B65G 47/084 |
| 10,589,953 B2* | 3/2020 | Allen, Jr. | ............... | B65H 29/50 |
| 11,064,705 B2* | 7/2021 | Van Blokland | ...... | B65G 47/084 |

FOREIGN PATENT DOCUMENTS

| | | |
|---|---|---|
| DE | 102014106400 A1 | 11/2015 |
| DE | 102014118978 A1 | 6/2016 |
| WO | 2014040952 A1 | 3/2014 |

\* cited by examiner

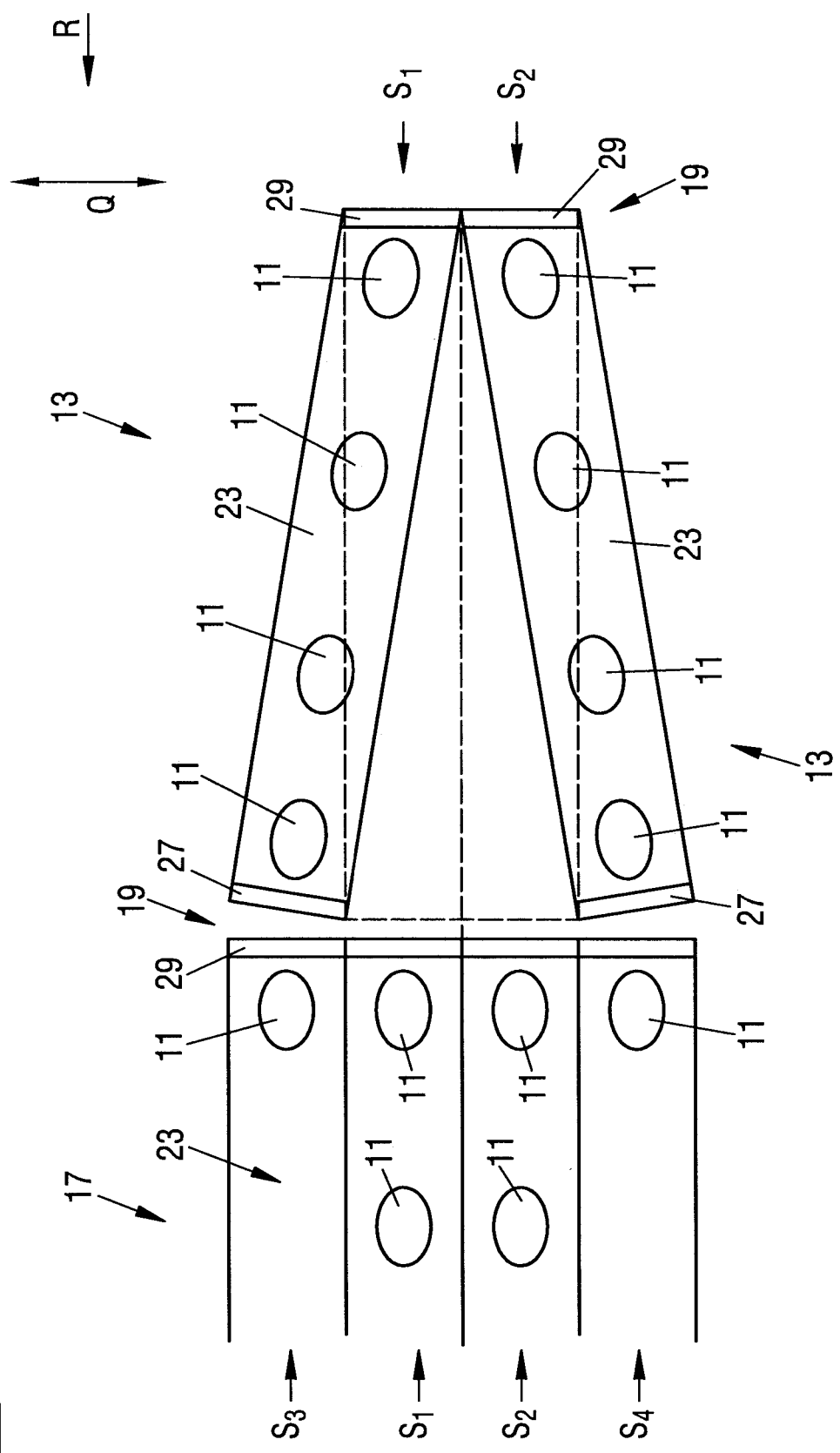

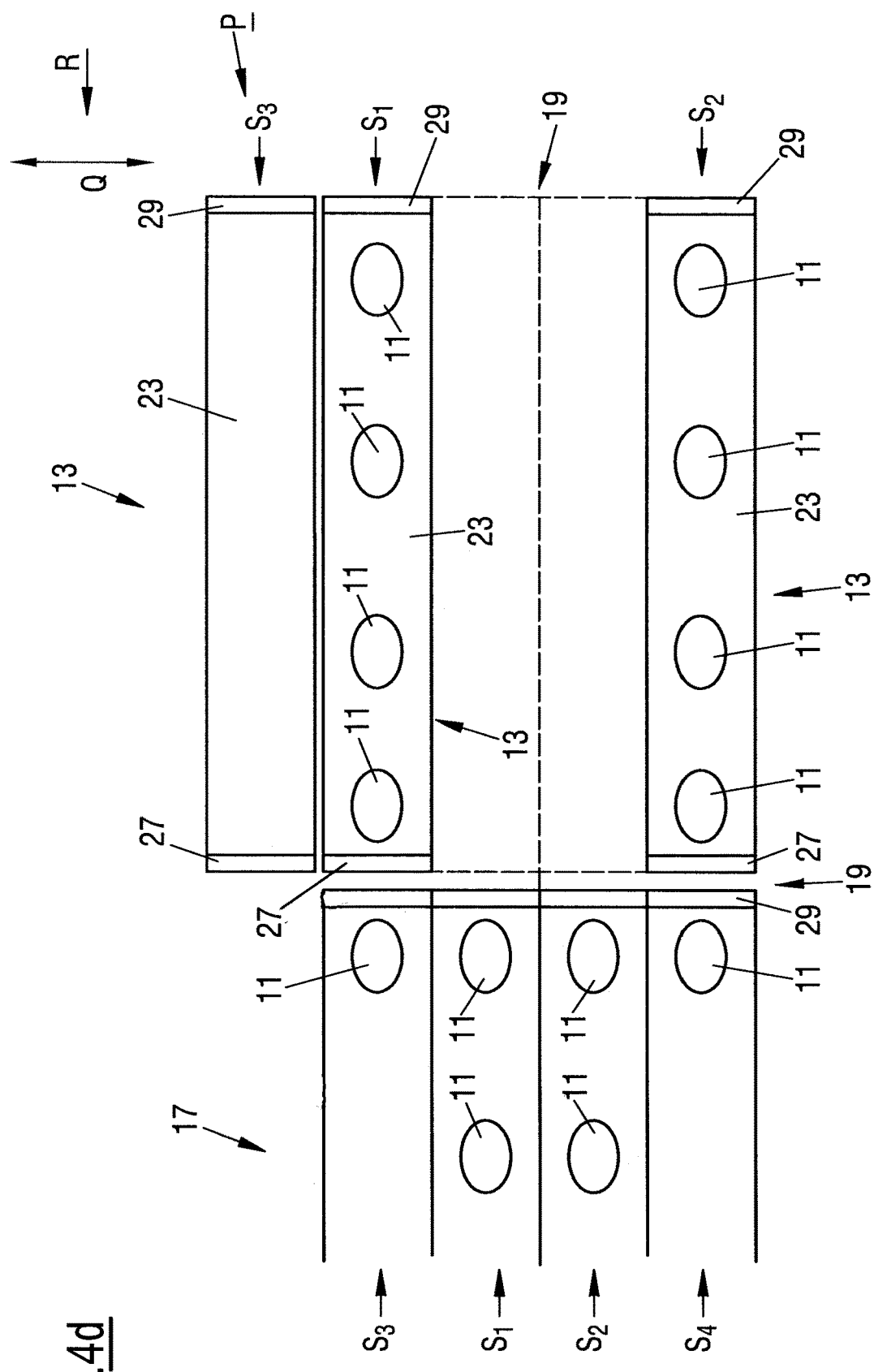

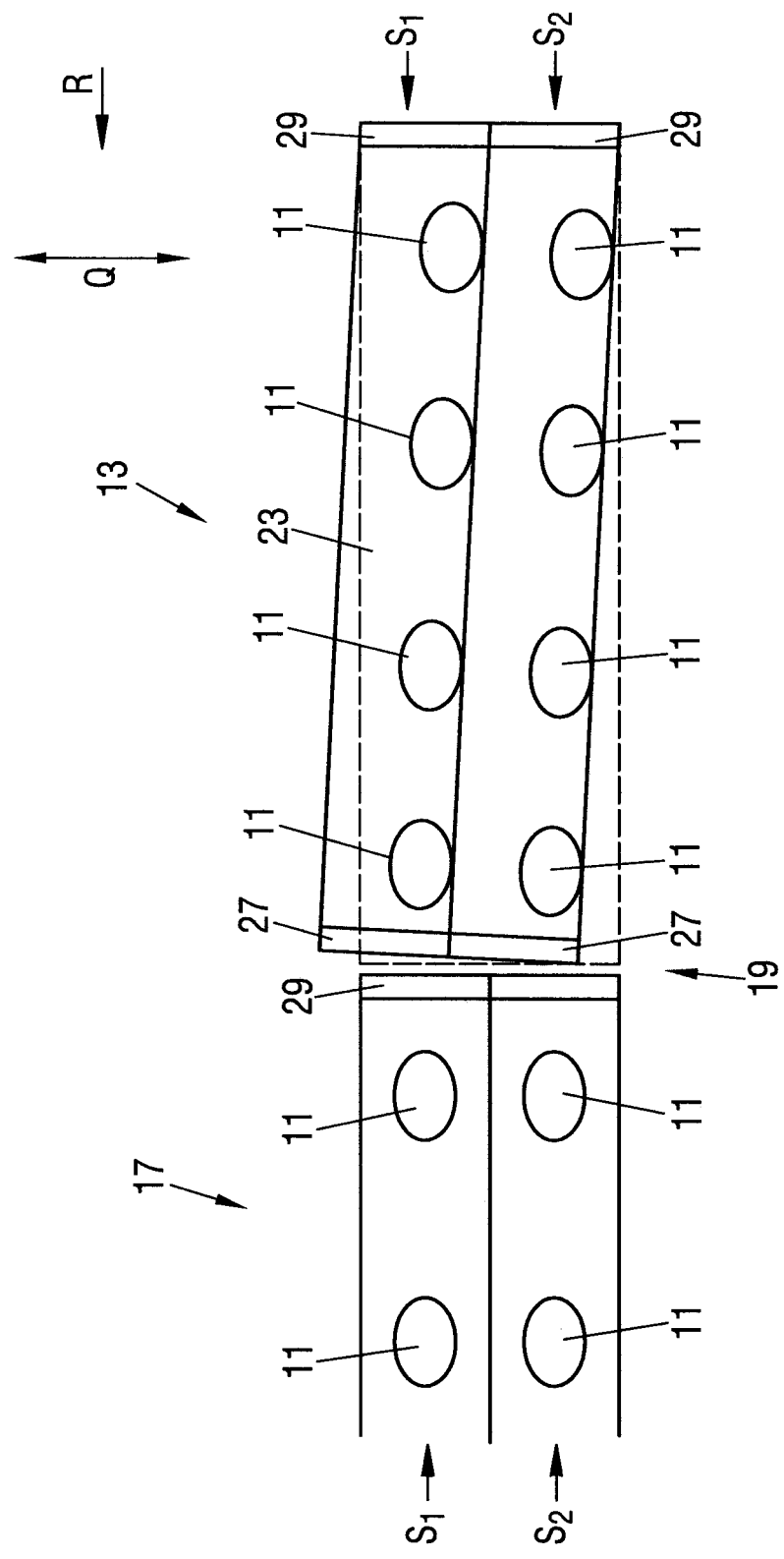

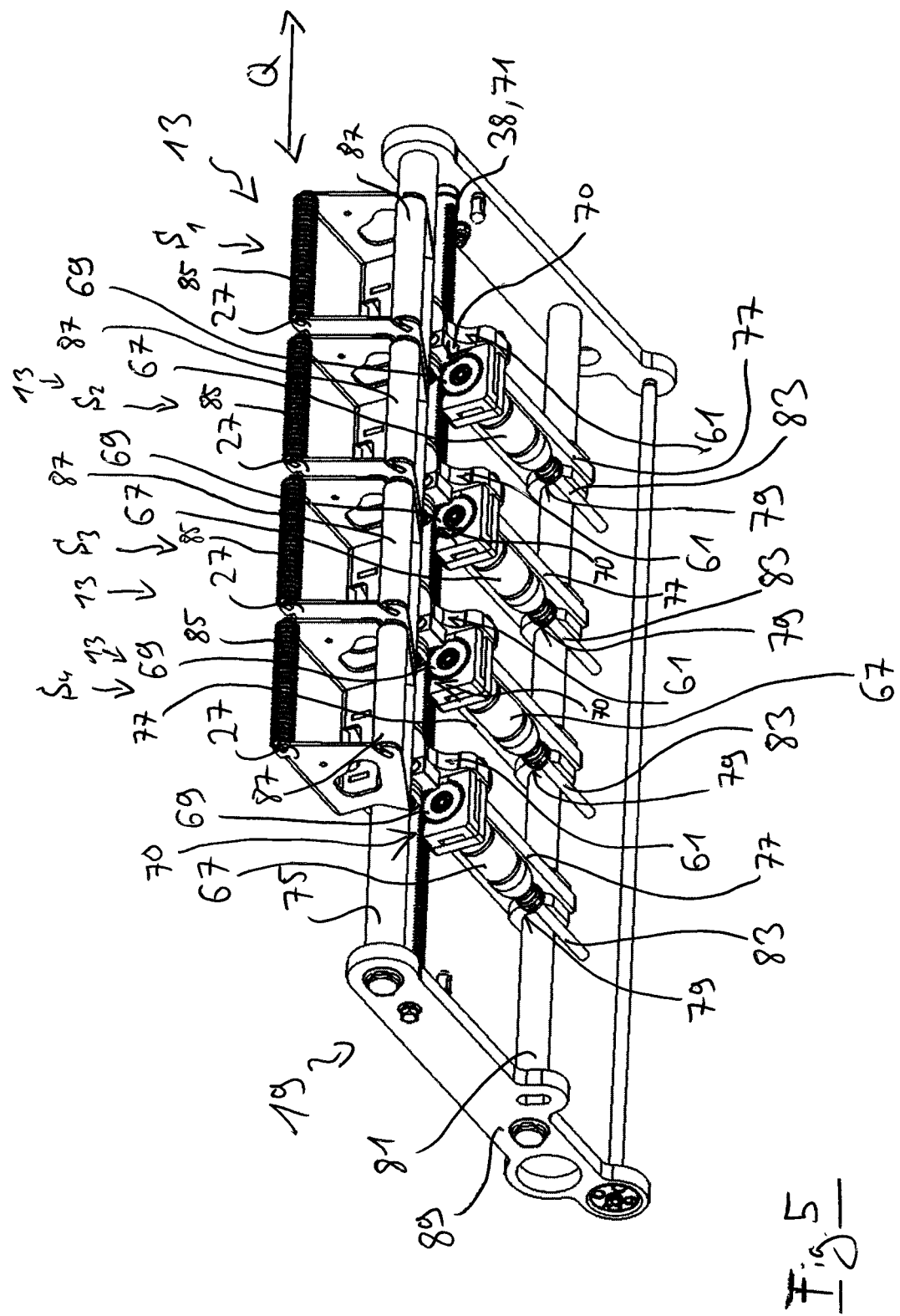

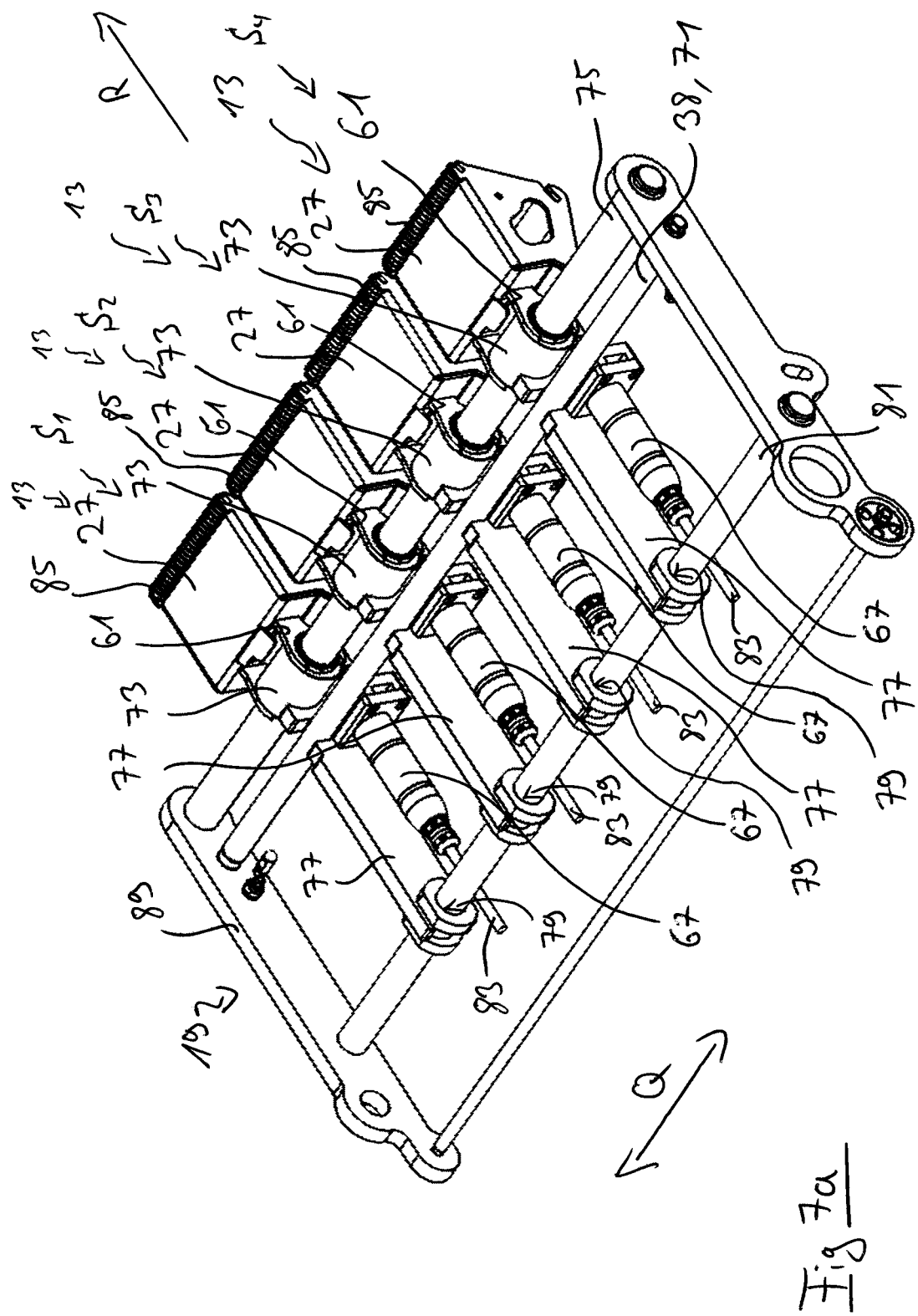

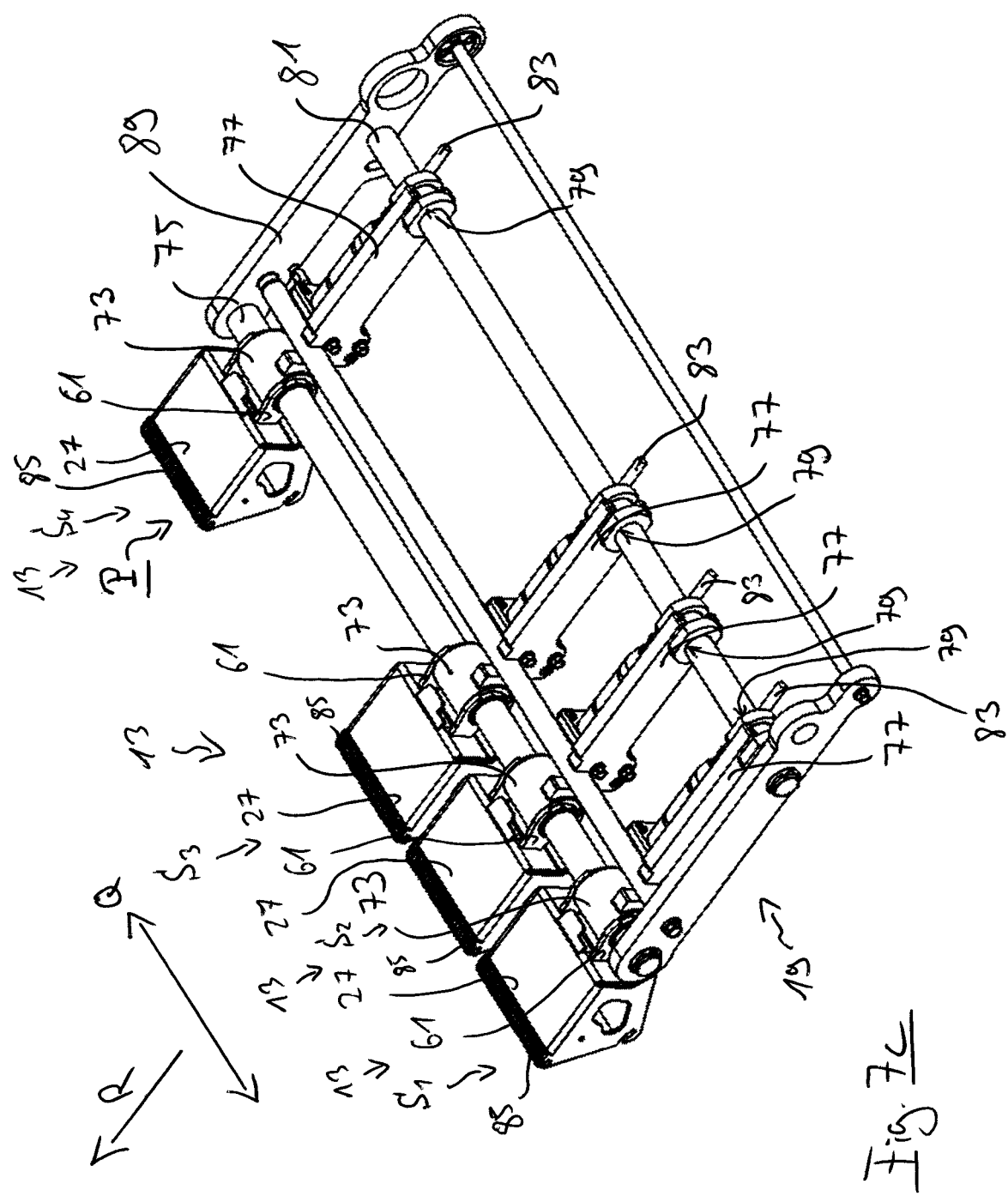

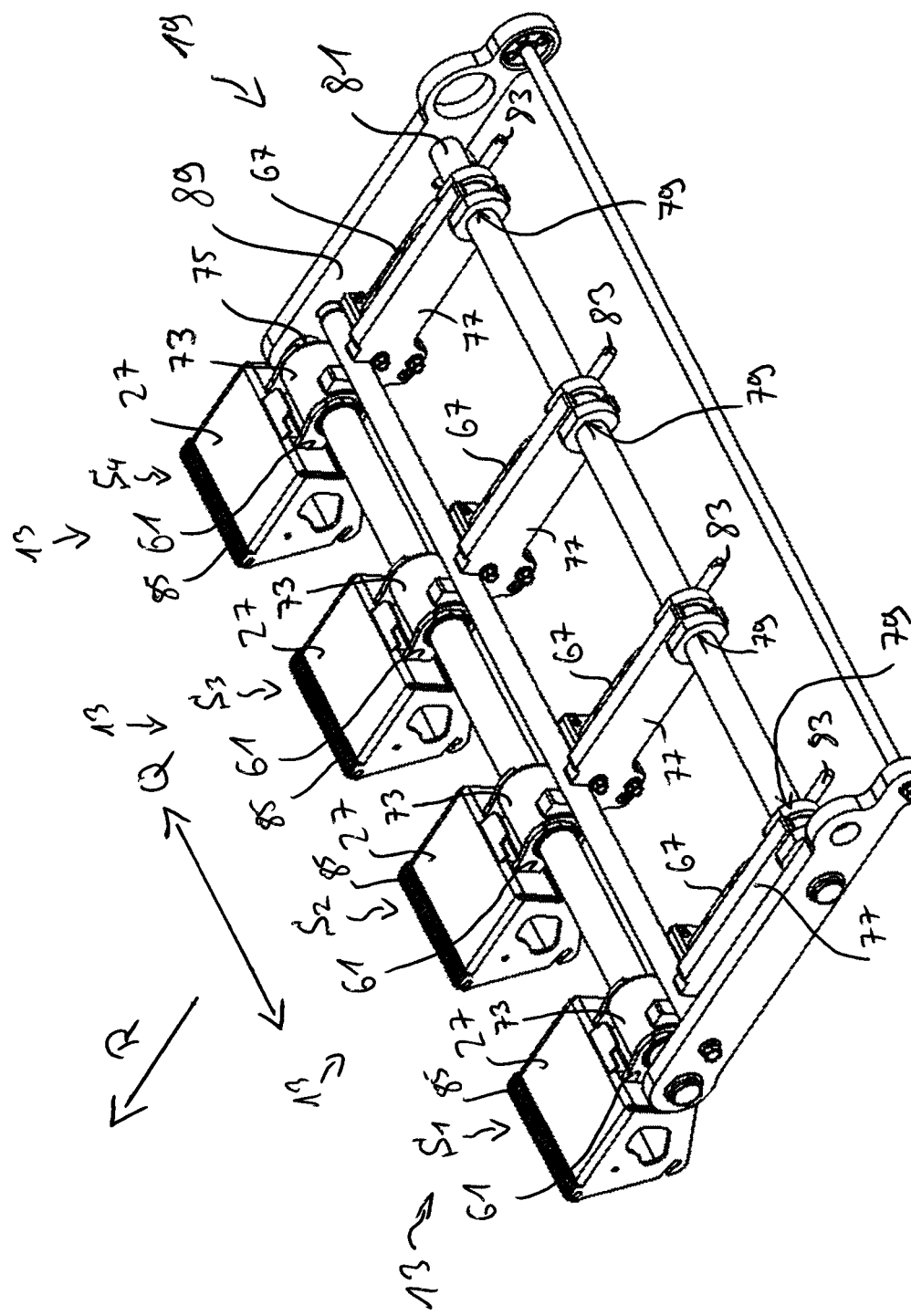

APPARATUS FOR CONVEYING PRODUCTS

The invention relates to an apparatus for the single-track or multi-track conveying of objects along a conveying path extending in a conveying direction, wherein the conveying path for at least one track comprises at least one conveying device that takes over objects at the input side from a functional unit connected upstream and that transfers objects at the output side to a functional unit connected downstream.

The invention also relates to a method of handling objects along a work path that comprises such an apparatus as well as to the use of one or more adjustment devices for adjusting at least one conveying device transversely to the conveying direction, by which conveying device objects are conveyed along a single-track or multi-track conveying path extending in the conveying direction and are in particular transferred to a packaging machine that is at least partly disposed downstream of the conveying path.

Such apparatus can in particular be used to convey portions of food products that are cut into slices in the cutting region of a slicing apparatus, in particular a high-speed slicer, to a packaging machine arranged downstream, for example to a deep-draw packaging machine, and to insert them there into recesses provided for this purpose or to place them onto other packaging spaces, for example, onto defined spaces of a material web pulled forward by the packaging machine. The conveying path can in this respect comprise a plurality of units that serve for conveying the objects, for example, for buffering the objects, for sorting, for weighing, or for forming so-called format sets. Due to the connection of a high-speed slicer to a packaging machine via such a conveying path, work paths can thus be implemented along which all the necessary steps from slicing the products through to the completely packaged end product can be carried out in a total system by the associated units.

With such apparatus and methods, one generally endeavors to increase the product throughput and the flexibility. For example, slicing apparatus designated as high-speed slicers can process bar-like or loaf-shaped food products at high cutting speeds of several hundred to some thousand slices per minute and can provide them for further handling. In many applications, stacked or overlapping portions are formed from the cut-off slices, e.g. on a portioning belt, and are then transported via a conveying path in order to be guided to a packaging machine arranged downstream and to be transferred there to packaging spaces provided. The portioning belt is typically understood as a component of the high-speed slicer and is thus a part of a functional unit arranged upstream of the conveying path.

The packaging machine of such a work path can, for example, be configured as a deep-draw packaging machine that comprises a molding station in which recesses for inserting the food portions fed via the conveying path are introduced into a material web pulled forward within the machine. The material web and thus the recesses can, for example, be transported beneath the conveying path and typically intermittently, wherein the transport of the food portions on the conveying path is synchronized with the transport of the recesses such that the food portions are inserted directly and precisely into the recesses by the unit of the conveying path that is last with respect to the conveying direction and that is frequently designated as the feeder. Alternatively, a material web can, for example, be transported in the packaging machine without recesses being introduced into it, wherein the food portions are merely placed onto predefined packaging spaces of the material web.

Subsequently, the recesses filled with food portions or the food portions placed onto the packaging spaces provided can be guided into a sealing station associated with the packaging machine, where the recesses or the portions are sealed in a vacuum-tight manner by a top film, in particular a top film fed from above. Furthermore, such packaging machines usually include one or more cutting stations at which the packages including the food portions are separated from one another such that the portions are ultimately present in separate packages and can be delivered.

In the course of an optimization of the product throughput, it is possible to operate high-speed slicers with multiple tracks by simultaneously slicing a plurality of products, optionally, products of different kinds. It is therefore also known to provide a device in the region of the conveying path that is configured to form so-called format sets from the cut-off slices or portions, said format sets each comprising a matrix-like arrangement of slices or portions and being formed with respect to the requirements of a packaging machine arranged downstream. By means of these devices, the number of tracks in which the food portions are guided to the packaging machine can be changed and adapted to the number of packaging spaces simultaneously transported by the packaging machine.

Known functional units that are connected upstream or downstream of the conveying path or of a respective conveying device of the conveying path, that is in particular high-speed slicers and packaging machines, but also other conveying devices, are already configured such that a satisfactory product throughput can be achieved with relatively high flexibility, including a distribution of products onto different tracks in a multi-track operation.

However, small inaccuracies in the cutting process, for example, in the format set formation, during the conveying of the foods, in the arrangement of the recesses in the packaging machine, or in other steps of the processing or of the operation can have the result that the food portions cannot be moved exactly into the recesses or onto the packaging spaces of the packaging machine. Therefore, it is usually necessary with current apparatus to check the position of the food portions in the recesses or in the finished packages by hand, which requires considerable personnel expenditure and may result in inappropriate product waste. Furthermore, poorly placed portions often cause disruptions in operation since the operation has to be stopped temporarily in order to determine the error and to make corrections to the apparatus.

It is therefore an object of the invention to further develop an apparatus for conveying objects along a conveying path such that the objects can be transferred in a manner positioned as exactly as possible to an output region, in particular to a packaging machine or to a conveying device connected downstream.

This object is satisfied by an apparatus having the features of claim 1.

Provision is made in the apparatus in accordance with the invention that the conveying device as a whole and/or in an output-side end region is adjustable transversely to the conveying direction by means of an adjustment device such that a transverse position of objects to be transferred is changed within the respective track.

In accordance with the invention, slight and precise transverse adjustments by less than the width of the track can be carried out by the adjustment device. This consequently enables a correction of the position of objects in the respective track that is continued in the same track in a functional unit connected downstream of the conveying device and associated with the conveying path or in a functional unit connected downstream of the conveying path. Such a correction of the objects within the track that allows a precise transfer to a functional unit connected downstream, in particular a precise insertion into or placement onto packaging spaces of a packaging machine, is not possible with known cross-distributors that are, for example, used for format set formation and thus for redistribution of the objects onto a plurality of tracks.

The invention does not preclude that the conveying device can also change the transverse position of the objects by adjustment in a transverse direction such that a transverse distribution of the objects onto different tracks in the sense of a track change is achieved. This—from the point of view of the invention, additional—functionality can preferably likewise be achieved by means of the adjustment device, i.e. the conveying device in this preferred embodiment of the invention can selectively be adjusted either within the respective track or to a larger degree in the transverse direction in order to transfer the objects to a directly adjacent track or to a track that is even further remote in the transverse direction.

The conveying device can be provided for exactly one track in accordance with the invention such that the transverse position of objects of this track can be changed by means of the adjustment device. Furthermore, objects of a plurality of tracks can be conveyed by means of a common conveying device such that the transverse position of objects of all the tracks associated with the conveying device can then be adapted by means of the adjustment device, in particular within their respective track.

The adjustment device is preferably arranged at an output-side end of the conveying device and the adjustment of the conveying device is performed at this output-side end. Thus, even in the adjusted state, objects can still be picked up at the input-side end of the conveying device, e.g. picked up in a centered manner by a functional unit connected upstream. The output-side transverse adjustment preferably takes place when there are no objects in the region of the adjustment device. In addition to an adjustment of the conveying device at the output-side end, it is also possible to adjust the conveying device as a whole, in particular after objects have e.g. been picked up centrally with respect to the respective track by a unit connected upstream and are already present on the conveying device.

The conveying path can form a part of a work path on which objects are conveyed from a functional unit connected upstream and associated with the work path, in particular from a slicer apparatus or a high-speed slicer, to a functional unit connected downstream and associated with the work path, in particular to a packaging machine. The conveying path can thus itself comprise a plurality of units, in particular for weighing the objects, for their sorting, or for forming format sets, and for buffering. Furthermore, the conveying path can comprise a feeder that serves to transfer the objects at the output side to a functional unit connected downstream and in particular to place the objects onto or into provided packaging spaces of a packaging machine arranged downstream. The conveying path accordingly comprises those units that are provided for conveying the objects from a unit connected upstream to a unit connected downstream, whereas these functional units connected upstream and functional units connected downstream, in particular a high-speed slicer and a packaging machine, merely represent components of the higher-ranking work path.

In accordance with an embodiment, the conveying path is of multi-track design and comprises a conveying device for each track, with the conveying devices being arranged next to one another and being adjustable independently of one another in the transverse direction. This allows a track-individual adjustment and thus a track-individual changing of the transverse positions of objects in the respective tracks. In this respect, it is both possible to correctly arrange the objects individually per track in the transverse direction, that is to only make slight changes such that the objects are guided further in their respective track after their transfer to a functional unit connected downstream, and to perform a track change of the objects and thus e.g. to form specific format sets and/or to increase or to decrease the number of tracks. If the number of tracks on the conveying path at the output side of the conveying device differs from the number of tracks on the conveying device, the number of tracks at the output side of the conveying device is usually increased, wherein it is also possible to achieve a track reduction by means of the transverse adjustment of the objects. Furthermore, it is possible to adjust a track, which is indeed provided on the conveying device, but not operated in the respective operating situation, into an outer parking position such that a maximum range of transverse adjustments is accessible for the further tracks that are in use.

The conveying device can comprise a revolving endless conveyor means, in particular a relatively wider endless conveyor belt or a plurality of relatively narrower endless conveyor bands arranged next to one another, with an output-side deflector for the endless conveyor means being adjustable in the transverse direction by means of the adjustment device. In this respect, the endless conveyor means of a plurality of conveying devices can be deflected via a common input-side deflector, while they preferably have separate output-side deflectors. This enables an at least output-side separation of the conveying devices and thus a track-individual adjustment of the respective conveying device.

In accordance with a further embodiment, the adjustment device comprises a movable element that is coupled to the conveying device, in particular to an output-side deflector of an endless conveyor means. In this respect, the conveying path can be of multi-track design and a conveying device can be provided for each track, wherein the adjustment device preferably comprises a movable element for each conveying device, and wherein the movable elements are movable independently of one another.

In accordance with an embodiment, the movable element of the adjustment device is configured as a rotor of a linear motor, in particular of a linear synchronous motor or of a linear induction motor. The rotor is in this respect preferably formed by a permanent magnet, whereas the stator can comprise the motor windings for generating alternating magnetic fields for driving and for positioning the rotor; and a bearing for the rotor. Alternatively, provision can also be made that the stator comprises one or more permanent magnets and provides a rod-like guide for the rotor, said rotor supporting the means for generating the driving and positioning magnetic fields. However, different drives, such as spindle drives or other drives, can also be provided, wherein the movable element of the adjustment device can then be formed by a spindle nut, for example.

Furthermore, the movable element can be drivable by means of a servomotor and/or can comprise a servomotor. Such a servomotor can have an electric motor of generally any design comprising a rotor, for example, a direct current motor, an asynchronous motor or a synchronous motor, and in particular comprises a measurement device that makes it possible to determine the exact position or the rotational position and/or the angle of rotation of the rotor at any time. This position measurement can in this respect take place via a rotary encoder, for example, for which purpose a resolver, an incremental encoder or an absolute value encoder can in particular be provided. The servomotor can be connected to a gear to convert the rotational movement of the rotor into a translatory movement of the movable element transversely to the conveying direction. The position of an element movable by means of the servomotor can in particular also be determined quickly and precisely by an integrated measurement device for directly determining the rotational position of a rotor in order to be able to flexibly perform any necessary corrections during operation to the transverse position of objects moving on the conveying device.

Provision can, for example, be made that the movable element is configured as a toothed wheel that is coupled to the conveying device and in particular to an end region of an endless conveyor means and whose teeth mesh with a toothed arrangement of a gear rack oriented transversely to the conveying direction. The toothed wheel can in this respect be precisely drivable or controllable by means of a servomotor such that the rotational position of the toothed wheel can be exactly specified. Due to the meshing toothed arrangements of the toothed wheel and of the gear rack, a translatory movement component in the transverse direction can be derived from a rotary movement of the toothed wheel for changing its rotational position in order to change or correct the position of the conveying device coupled to the toothed wheel in the transverse direction.

In accordance with an embodiment, the adjustment device comprises a servomotor for adjusting the conveying device that is coupled to the conveying device, with the servomotor in particular being able to be coupled to an output-side deflector of an endless conveyor means. The servomotor can in this respect consequently be directly connected to the conveying device and can be movable together with the conveying device in the transverse direction in order to be able to make corrections to the position of the conveying device. In this respect, the servomotor can also in particular drive a toothed wheel revolving in a gear rack extending in the transverse direction such that a rotary movement of the toothed wheel can be converted into a translatory movement of the servomotor in the transverse direction by the mutually meshing toothed arrangements of the toothed wheel and of the gear rack. Accordingly, the conveying device coupled to the servomotor can also be moved in the transverse direction.

The servomotor can in this respect in particular be connected to a transmission element that can be a part of a coupling for transmitting the movement of the servomotor to the conveying device. Such a transmission element can, for example, be configured as rail-like or wall-like and as extending in the conveying direction such that the transmission element can form a holder for the servomotor or can be connected to such a holder in order in particular to be able to position the servomotor beneath the conveyor.

Provision can be made that a rack and pinion gear that can be acted on by means of the servomotor is connected between the servomotor and the conveying device, in particular an output-side deflector of an endless conveyor means. The rack and pinion gear can in this respect in particular be provided to move a toothed wheel, set into rotation by the servomotor, in the transverse direction in order to be able to make corrections to the transverse position of the conveying device. The servomotor itself can furthermore be coupled to the toothed wheel and to the conveying device such that the servomotor can be movable in the transverse direction together with such a toothed wheel.

Furthermore, the servomotor can be configured to drive an adjustment element in a rotational manner, with the adjustment element being able to be guided in a guide device that is configured to convert a rotary movement of the adjustment element into a translatory movement of the servomotor and of the conveying device coupled thereto transversely to the conveying direction. The adjustment element can in particular be configured as a toothed wheel that meshes with a toothed arrangement of a gear rack extending transversely to the conveying direction. Alternatively, provision can, for example, also be made that the servomotor drives a wheel revolving in a guide rail, wherein a translatory movement component can be derived from the rotary movement of the wheel due to friction.

In accordance with a further embodiment, the conveying path is of multi-track design and the adjustment device comprises a servomotor for each track. The conveying path can in this respect have a conveying device for each track that, in particular by way of one of the possibilities explained above, can be movable in the transverse direction by the respective servomotor individually and independently of the other conveying devices. Inaccuracies of the transverse position of objects to be transferred can thereby, for example, be corrected in each of the plurality of tracks independently of the other tracks such that, for example, placement errors of a high-speed slicer operated with multiple tracks that only relate to one track can be corrected exactly in the respective track without influencing the operation in the other tracks.

In accordance with an embodiment, the adjustment device comprises a linear motor having a stator and having a rotor coupled to the conveying device. The rotor can in this respect in particular be positioned at the output-side end of the conveying device such that belt transitions can be used during the transfer of the objects in that the objects are transferred in a correctly positioned manner to the next belt. Provision can likewise be made to arrange the rotor at the input-side end of the conveying device or to respectively arrange one or more rotors at both ends of the conveying device.

Provision can furthermore be made that the conveying path is of multi-track design and the adjustment device comprises a linear motor for each track.

In accordance with a further embodiment, provision can be made that the conveying path is of multi-track design and the adjustment device comprises a common linear motor for all the tracks that comprises a rotor for each track.

The common linear motor can comprise a common stator for all the rotors which extends in the transverse direction over all the tracks and at which the rotors, which are each associated with one of the tracks, are guided during their respective adjustment movement. Such a guide of the track-individual rotors in a common stator allows a particularly space-saving design of the adjustment device. Due to the displacement of the rotors in a common plane, a particularly simple retrofitting of already existing conveying devices can be achieved. However, provision can also be made in some embodiments, in particular in dependence on the actually present space conditions, that the displaceable elements of the adjustment device are supported on guides offset in parallel, in particular rotor rods or individual stators.

In accordance with a preferred embodiment, the common linear motor comprises a common stator for all the rotors and is controllable such that the rotors are movable independently of one another along the stator. This allows a track-individual adjustment of the transverse position of objects on the conveying path and minimizes the space requirement necessary for the adjustment device.

A controlling device can furthermore be provided that is configured to detect the transverse position of objects on the conveying device and/or on a functional unit connected upstream of the conveying device and/or on a functional unit connected downstream of the conveying device. Accordingly, at least the transverse position of the objects is detected by means of the controlling device and is used as a decisive criterion for a transverse adjustment. However, the controlling device can also be configured to detect further object properties in addition to the transverse position, in particular the position of the objects, i.e. also their longitudinal position, their size, the quality of the objects or their weight, wherein the measurement values can be processed at the apparatus in accordance with the invention or at another point of the work path.

The controlling device can comprise at least one sensor that is arranged in a region of the conveying device or in a region of the functional unit and that determines information on the transverse positions of the objects within the track. Thus, in addition to means for detecting the position of the objects, the controlling device can also include further means, in particular for processing the transmitted position and for forwarding this position.

In accordance with a preferred embodiment, the controlling device, in particular as a sensor arranged in the region of the conveying device or of the functional unit, comprises an image recording device, in particular a camera system or a scanning device, by means of which a position of objects within a track and/or simultaneously within a plurality of tracks can be determined. This allows a wealth of precise information on the position of the objects to be determined such that a necessary adjustment can be determined as precisely as possible. Furthermore, as mentioned above, further features, in particular with respect to the quality of the objects, can also be obtained from the recorded images and can be processed by the controlling device.

Provision can be made that the controlling device comprises a plurality of sensors that are arranged distributed along the conveying path to determine a position of objects at different locations. By detecting the position of objects at different locations, it is possible to monitor a plurality of potential error sources simultaneously and to make any necessary corrections.

In accordance with an embodiment, a control device is provided that is configured to adjust the conveying device in the transverse direction by means of the adjustment device in dependence on the transverse positions of the objects detected by means of the controlling device. Provision can in this respect be made that the control device automatically performs the transverse adjustment and any necessary corrections take place in ongoing operation and without external intervention such that no interruptions of the operation are necessary.

Furthermore, the control device can be configured to change a conveying speed of the conveying device in order to correct a longitudinal position of the objects to be transferred. Such a correction of the longitudinal positioning in particular allows the row formation and format formation of objects. Furthermore, errors in the longitudinal position can thus also be compensated that, for example, arise due to an uneven falling of the slices onto a portioning belt after the cutting off at the slicer or due to any differences of the path distance. It is in particular possible to fill gaps in the portion flow that can arise in a track due to a premature end of the slicing in the respective track if only a short product bar compared to the other tracks is sliced in this track, or due to portions possibly expelled after the weighing.

The invention further relates to an apparatus for handling objects, i.e. to a device for handling objects, along a work path comprising an apparatus in accordance with any one of the above-described embodiments whose conveying path, comprising the at least one conveying device, forms a part of the work path; a controlling device that is configured to detect the transverse position of objects on the conveying device or on a functional unit connected upstream or connected downstream of the conveying device; and a control device that is configured to adjust the conveying device in the transverse direction in the case of a deviation of the detected transverse position from a desired transverse position in order to correct the transverse position of objects to be transferred within the respective track.

This apparatus represents a further aspect of the invention for which protection is also claimed independently.

In addition to the conveying path and its associated units, the apparatus therefore in particular also comprises a functional unit that is connected downstream of the conveying path and that can, for example, be configured as a packaging machine. The conveying path and the functional unit connected downstream are thus each a component of the work path that can also comprise a functional unit connected upstream of the conveying path, in particular a high-speed slicer.

The objects are preferably detected by the controlling device directly after the transfer onto the conveying path and, if necessary, the conveying device is adjusted in the transverse direction by the control device in accordance with the position of the objects such that the objects at the output-side end of the conveying device are transferred therefrom in their desired transverse position.

In accordance with an embodiment, the work path comprises a packaging machine, in particular a deep-draw packaging machine, that is at least partly arranged downstream of the conveying path. Provision can preferably be made in this respect to detect the position of the objects directly after the transfer to the packaging machine and to compare said position with the desired position on or in predefined packaging spaces, wherein, in the case of a detected deviation, the control device performs a transverse adjustment of the conveying device in order to correct the position of subsequent objects to be transferred.

Provision can be made that the conveying device or a functional unit connected downstream of the conveying device, in particular a placement belt or insertion belt, is configured to transfer the objects from the conveying path to respective associated packaging spaces of the packaging machine, in particular to place them onto a material web transported in the packaging machine or to insert them into recesses of a material web transported in the packaging machine. The possibility of a precise insertion of the objects into or placement of the objects onto provided packaging spaces within the packaging machine represents a particular advantage of the invention in this respect.

In accordance with an embodiment, the controlling device is configured to detect a position of the objects at the packaging spaces and in particular relative to predefined boundaries of the packaging spaces. Accordingly, the position of the objects on the material web, if only packaging spaces not formed by recesses are provided, or in the recesses is in particular detected.

The invention further relates to a method of handling objects along a work path using an apparatus or a device in accordance with any one of the above-described embodiments, in which the transverse position of objects on the conveying device and/or on a functional unit connected upstream of the conveying device and/or connected downstream of the conveying device is detected; and in which the conveying device is adjusted in the transverse direction in the case of a deviation of the detected transverse position from a predefined or predefinable desired transverse position in order to correct the transverse position of the objects to be transferred within the respective track.

This method represents a further aspect of the invention for which protection is also claimed independently.

The correction of the transverse position in this respect preferably takes place during operation. Alternatively, provision can also be made to align the conveying device during operational breaks, in particular when changing batches. The adjustment of the conveying device is preferably performed in an output-side end region, in particular while there is no object in the region at which the adjustment device engages.

The control device can be configured to carry out a trend regulation when the transverse positions of the objects are corrected. If e.g. a continuous deviation from the desired state of the transverse position is determined in a direction, this trend is already counteracted while adjusting the conveying device, even if the continuous deviation is not yet reflected in a position of the objects outside a predefined tolerance range. Possibly occurring errors can thus already be counteracted before a relevant operational impairment is present. It is furthermore possible to optimize the conveying of the objects in ongoing operation and thus to ensure or even increasingly improve it for the entire duration of the operation such that possible product waste can also be minimized.

The invention furthermore relates to a method of adjusting at least one conveying device transversely to a conveying direction using one or more adjustment devices, i.e. the use of one or more adjustment devices for adjusting at least one conveying device transversely to the conveying direction, by which conveying device objects are conveyed along a single-track or multi-track conveying path extending in the conveying direction and are in particular transferred to a packaging machine that is at least partly arranged downstream of the conveying path, wherein the adjustment device comprises a guide extending in the transverse direction and at least one element that is associated with the conveying device, that is movable in a controlled manner along the guide in the transverse direction by means of a control device, and that is coupled to the conveying device; and wherein the transverse position of the object to be transferred is changed by moving the element along the guide.

The use of such an adjustment device or adjustment devices represents a further aspect of the invention for which protection is also claimed independently.

In accordance with an embodiment, the conveying device is adjusted to correct the transverse position of the objects to be transferred within the track; or, in the case of a multi-track conveying path, to distribute the objects to be transferred from the respective track to one of the other tracks; or to move into a parking position in order to change the number of tracks.

Provision can be made that the adjustment device comprises a linear motor whose stator forms the guide, and wherein the movable element is configured as a rotor of the linear motor; or that the adjustment device comprises a spindle drive whose threaded spindle forms the guide, and wherein the movable element is configured as a spindle nut of the spindle drive. Embodiments of the adjustment device differing from this are likewise possible, i.e. the adjustment device or its drive is not restricted to the use of a linear motor or a spindle drive.

Figure 2:
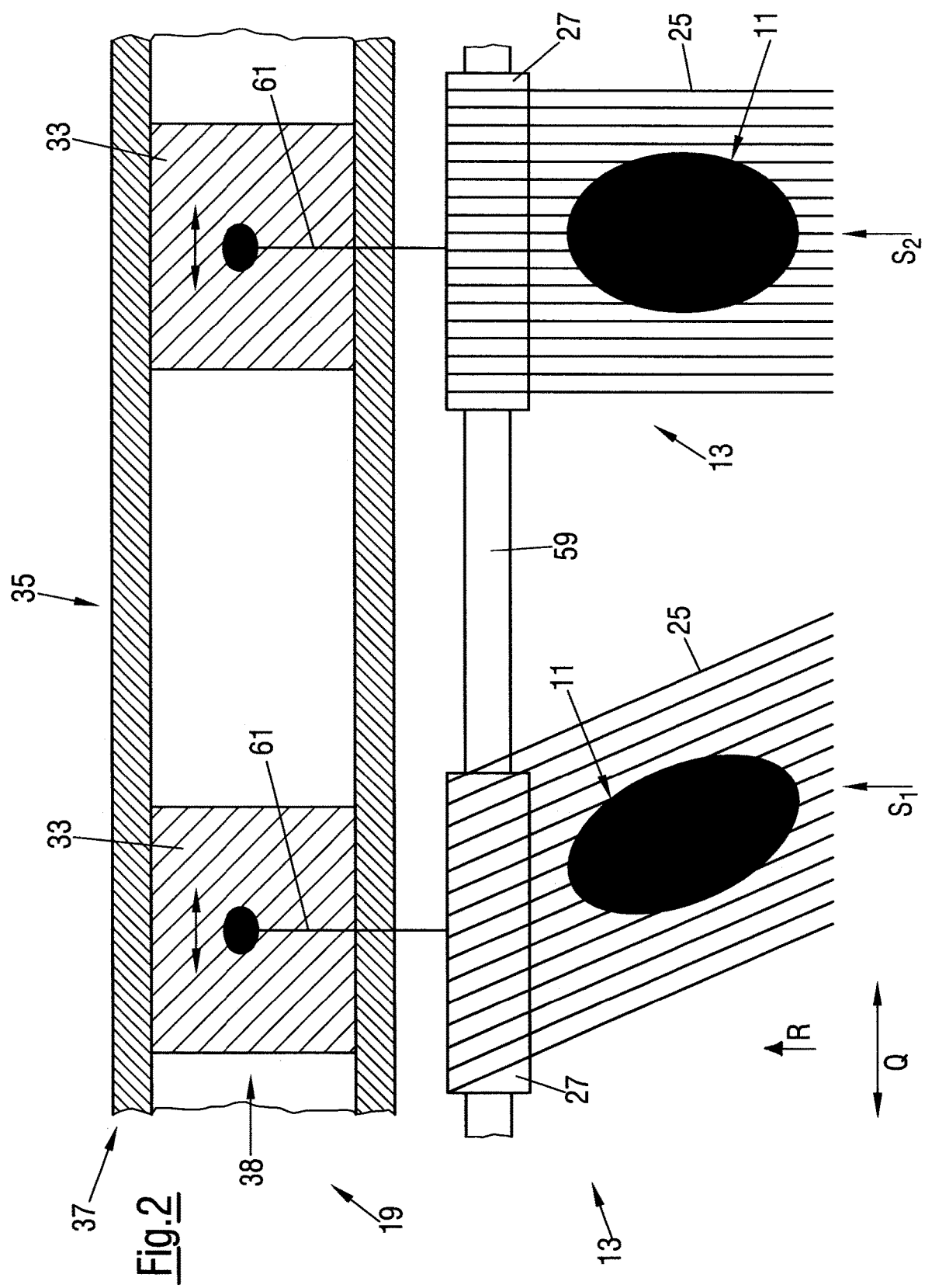
Figure 3:
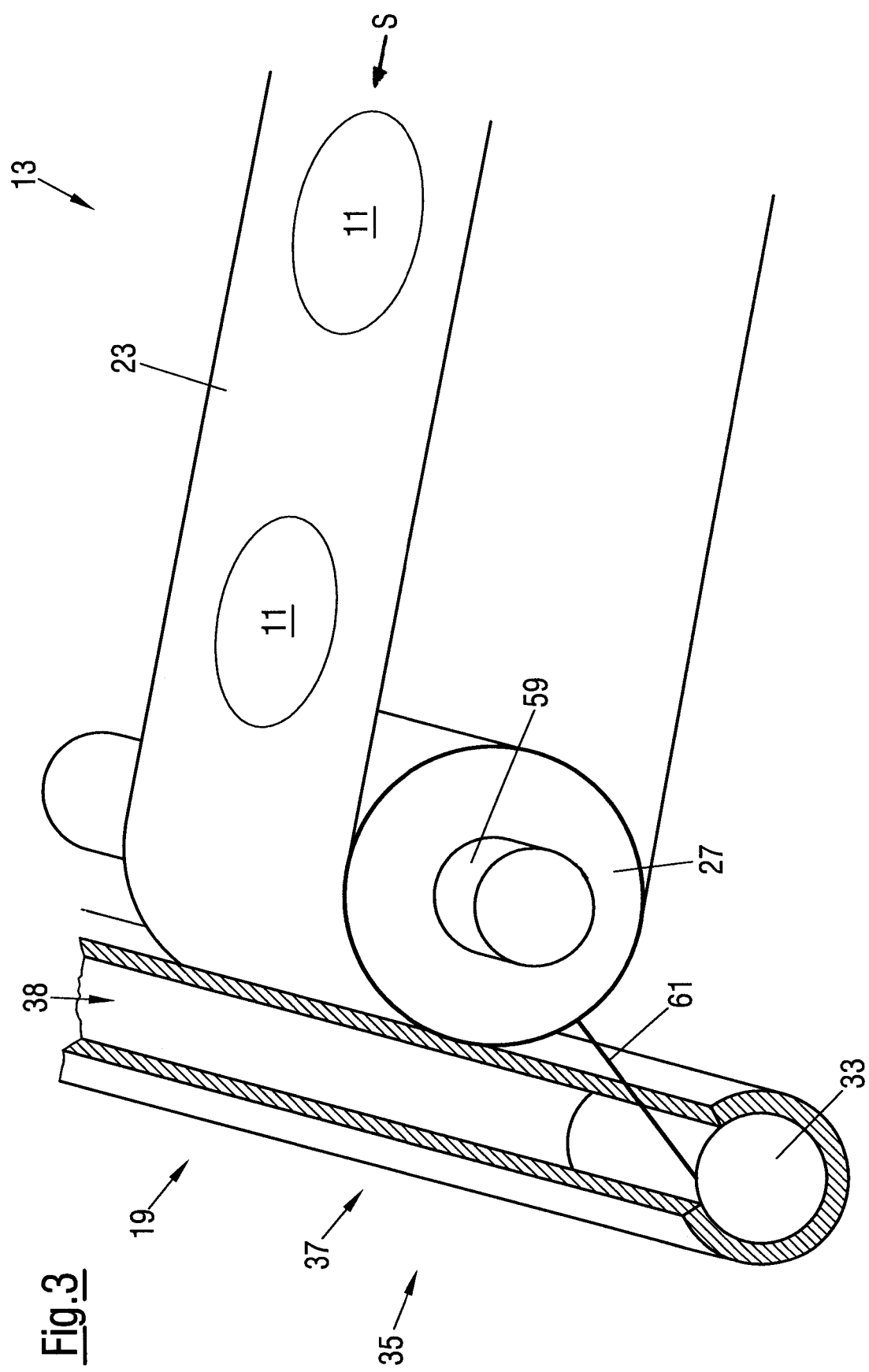
Figure 6:
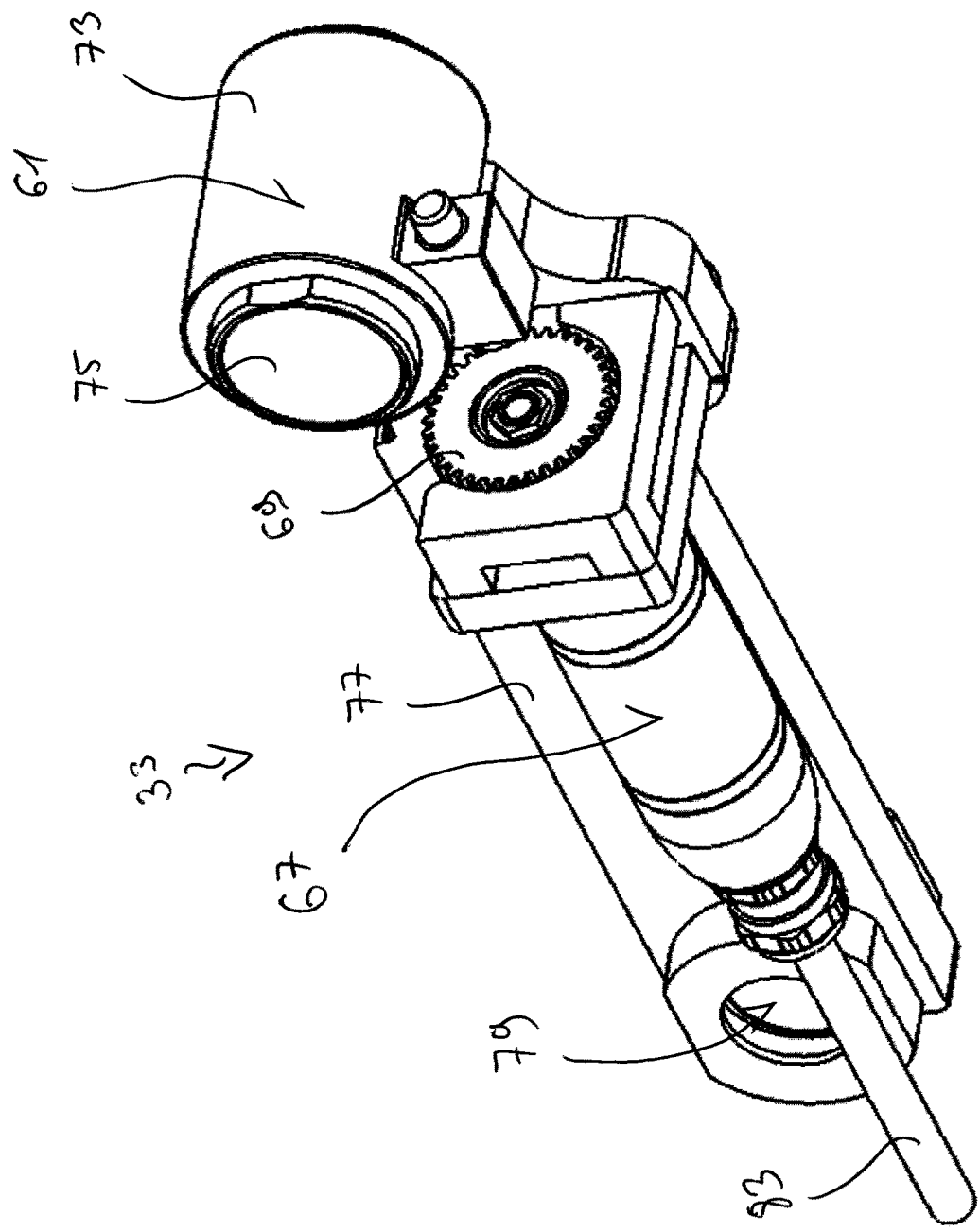

The invention will be described in the following by way of example with reference to the drawings. There are shown:

FIG. 1 schematically an apparatus in accordance with the invention for handling objects along a work path;

FIG. 2 schematically a plan view of conveying devices of an apparatus in accordance with the invention that are coupled to movable elements of an adjustment device;

FIG. 3 schematically a perspective view of a conveying device of an apparatus in accordance with the invention that is coupled to a movable element of an adjustment device;

FIGS. 4*a* to 4*f* schematically, in each case, possible applications of adjustment devices for the transverse adjustment in accordance with the invention of conveying devices;

FIG. 5 a perspective bottom view of servomotors for the individual adjustment of conveying devices coupled to respective end sections of the conveying devices;

FIG. 6 a perspective view of one of the servomotors; and

FIGS. 7*a* to 7*d* respective perspective plan views of the end sections coupled to servomotors in different settings of their transverse positions.

FIG. 1 shows an apparatus for handling objects 11 along a work path A that here comprises a high-speed slicer 15 connected upstream of a conveying path F; the conveying path F; and a packaging machine 18 at least partly arranged downstream of the conveying path F, wherein only the part of the packaging machine 18 directly adjoining the conveying path F is shown in FIG. 1.

Food product bars, not shown, are cut into slices by the high-speed slicer 15 and form portions 11 on a portioning belt 55 that is typically considered as belonging to the high-speed slicer 15 and thus not to the conveying path F. In the example shown, the apparatus is operated with three tracks and the food product bars are fed to the high-speed slicer 15 in three tracks and sliced by the latter such that portions 11 are formed in tracks $S_1$, $S_2$ and $S_3$ on the portioning belt 55. This three-track operation serves only for an exemplary illustration and is in no way restrictive with respect to the apparatus in accordance with the invention. Instead, any desired number of tracks S can generally be implemented, wherein four to eight tracks in particular represent a common area of application of high-speed slicers 15.

The completed portions 11 are transferred from the portioning belt 55 to an endless conveyor belt 23 that here represents the first unit which is comprised by the conveying path F and along which the portions 11 are conveyed in the conveying direction R. The portions 11 can, for example, be weighed on this endless conveyor belt 23 and from there can move onto a rocker 65 that is configured as a tiltable endless conveyor belt 23 for each of the tracks $S_1$ to $S_3$ such that defective portions 11 can be separated.

Subsequently, the food portions 11 are guided by a buffer 63 on which there are actually no portions 11 in the operating state shown in FIG. 1. The buffer 63 in particular serves to compensate gaps in the portion flow that, for example, arise during a change of an already sliced product bar in a track. The endless conveyor belts 23 that belong to the buffer 63 and that are each associated with a track $S_1$ to $S_3$ are driven via a drive motor 57 that drives the input-side deflectors 29 of the endless conveyor belts 23. The portions 11 are thus conveyed onto further track-individual endless conveyor belts 23 and move from there, again via a drive motor 57 engaging at an input-side deflector 29, into a region in which a conveying device 13 adjustable in a manner in accordance with the invention is provided for each track.

These conveying devices 13 are each associated with one of the tracks $S_1$ to $S_3$ and comprise both an input-side deflector 29 and an output-side deflector 27. The portions 11 are conveyed in the conveying device 13 in each track S via a plurality of endless conveyor bands 25 that together provide a track-individual endless conveyor means. The output-side deflectors 27 of the respective endless conveyor means are in this respect coupled to movable elements 33, not shown (cf. FIGS. 2, 3, 4 to 7d), of an adjustment device 19 by which the output-side end of the conveying device 13 can be adjusted in the transverse direction Q.

Due to such a transverse adjustment of the output-side deflectors 27 of the conveying devices 13, portions 11 that do not run with a predefined transverse position in their track S within a respective conveying device 13 can nevertheless be transferred in a manner correctly oriented in the transverse direction Q to a functional unit 17 that is connected downstream and that is here formed by further endless conveyor belts 23. As shown in FIG. 1, the above-mentioned movable elements 33 (cf. FIGS. 2, 3, 4 to 7d) coupled to the output-side deflectors 27 of the conveying devices 13 can be moved independently of one another in the transverse direction Q such that an individual transverse adjustment independent of the respective other tracks can be produced in each track S and the transverse position of the portions 11 can thus be corrected individually per track.

The portions 11 move, again by a driving of the conveyor belts 23 by means of a drive 57 engaging at the input-side deflector 29, from the endless conveyor belts 23 connected downstream of the conveying devices 13 adjustable in accordance with the invention onto a feeder 47 comprising an endless conveyor belt 23. The conveying movement of the feeder 47 via its drive 57 is in this respect synchronized with the typically intermittent, clocked feed of the packaging machine 18, which is arranged at least partly downstream of the conveying path F, such that the portions 11 are inserted with an exact fit by the feeder 47 into recesses 53 of the material web 51 that are provided for this purpose, said material web 51 being pulled forward in a correspondingly clocked manner by the packaging machine 18.

In the embodiment shown, the material web 51 is transported by the packaging machine 18 beneath the conveying path F, which is illustrated by the portions 11 that are shown disproportionately small in the recesses 53.

A plurality of sensors 43 that are here configured as image recording devices 43, e.g. in the form of cameras, are arranged along the work path A. By means of these image recording devices 43, the position of the objects 11 at different locations of the work path A can be detected and transmitted to a controlling device 39, with the cameras 43 being able to be understood as components of said controlling device 39.

Thus, the position of the objects 11 within the recesses 53 in the material web 51 of the packaging machine 18, the position of the objects 11 on the feeder 47, the position of the objects 11 on the conveyor belts 23 connected downstream of the buffer 63, or the position of the objects 11 after the transfer from the portioning belt 55 to the first unit of the conveying path F can be checked, for example.

The controlling device 39 serves to evaluate the information transmitted from the image recording devices 43 and to transmit said information to a control device 45 that is configured to control the movable elements 33 (cf. FIGS. 2, 3, 4 to 7d) of the adjustment device 19 individually per track in order to make a correction of the transverse position of the objects 11 in their respective track $S_1$ to $S_3$. In this respect, the controlling device 39, with the exception of the cameras 43, can be implemented as a component of the control device 45 and thus merely as suitable software for processing the information of the image recording devices 43. However, provision can also be made to integrate the controlling device 39 as a separate component. The control device 45 is preferably the central control of the total system comprising the slicer 15; the conveying path F; and the packaging machine 18.

In the embodiment of FIG. 1, the position of the objects 11 is detected at two locations arranged upstream of the conveying device 13 and at two locations arranged downstream of the conveying device 13 with respect to the conveying direction R. It is therefore possible to check a plurality of sources that can lead to an imprecise positioning of the portions 11 on the associated track S, such as an imprecise falling of the slices onto the respective track S after the cutting off, distortions of the formats in the buffer 63, or an imprecise transfer of the objects 11 onto the feeder 47 or to the provided recesses 53 in the material web 51. By also transmitting information on the position of the objects 11 at locations connected downstream of the conveying device 13 to the controlling device 39, the effect of the transverse adjustment performed and the correction made by the control device 45 can thus be checked. This makes it possible to optimize the precision of the correction in the ongoing process, for example, in that the controlling device 39 or the control device 45 comprises a self-learning algorithm by means of which subsequent corrections can be adapted to the results of previous corrections.

A corresponding control loop can in particular be implemented by means of the concept in accordance with the invention in which the transverse position of portions 11 within a respective track S is changed by means of the adjustment device 19 within the respective track in dependence on deviations of the actual transverse position, which is determined upstream and/or downstream of the respective conveying device 14, from a desired transverse position.

Provision can likewise be made to position a plurality of conveying devices 13, each adjustable in the transverse direction Q in a manner in accordance with the invention, along the conveying path F and thus to directly correct recognized deviations of the position of the portions 11 at different locations. It is furthermore advantageous if the conveying devices 13 have separate input-side deflectors 29 for each track that can be supported on a common shaft, but are driven individually per track by means of the drive 57 such that a longitudinal adjustment of the portions 11 or a correction along the conveying direction R can also be carried out individually per track at the conveying devices 13.

Furthermore, not only information on the position of the portions 11 can be obtained by the image recording device 43, but further data, for example with respect to the weight of the portions 11 or their quality, can also be detected and processed by the controlling device 39 or by the control device 45.

FIGS. 2 and 3 each show a view of an region of output-side deflectors 27, coupled to an adjustment device 19, of conveying devices 13 adjustable in a manner in accordance with the invention. In accordance with FIG. 2, objects 11 are transported in two tracks $S_1$ and $S_2$ in the conveying direction R, in each case by a conveying device 13 associated with their track $S_1$ or $S_2$. The output-side deflectors 27 of the conveying devices 13 are arranged on a common support 59 and the conveying devices 13 each comprise an endless conveyor means that is here formed by a plurality of narrow endless conveyor bands 25 arranged at a spacing from one another in the transverse direction.

The output-side deflection rollers 27 of the conveying devices 13 are each connected to one of the displaceable elements 33 of the adjustment device 19, which are here configured as rotors 33 of a linear motor 35, via a coupling 61 shown purely schematically here. The rotors 33 are surrounded by a stator 37 that includes the necessary windings for generating alternating magnetic fields for driving and positioning the rotors 33 in the transverse direction Q and provides a guide 38 for the rotors 33. Alternatively, the stator 37 can, conversely, be formed by one or more permanent magnets, while the means for generating the alternating magnetic fields are included in the rotors 33.

Consequently, the rotors 33 have a common stator 37 and can be moved independently of one another relative to the stator 37. Such linear motors having rotors that are movable independently of one another are generally known to the skilled person and are available on the market such that the design and mode of operation of such linear motors do not have to be explained in more detail here. The use of such linear motors for the apparatus and applications disclosed herein, in contrast, represents an aspect of the invention.

By connecting the output-side deflection rollers 27 of the conveying devices 13 via respective couplings 61 to the rotors 33, the conveying devices 13 can be individually adjusted and the position of the objects 11 in the associated track S can be changed. As shown in FIG. 2, the track $S_1$ is adjusted in the transverse direction Q with respect to the conveying direction R such that the conveying direction in this track $S_1$ extends obliquely to the conveying direction R, whereas no deflection with respect to the conveying direction R has taken place in the track $S_2$ and the objects 11 are thus further conveyed solely in parallel with the conveying direction R.

FIG. 3 shows an adjustment device 19 that comprises a linear motor 35 whose stator 37 provides a tubular guide 38 for a rotor 33 that is coupled via a coupling 61 to the output-side deflector 27 of an endless conveyor belt 23 of a conveying device 13.

The coupling 61 between the rotor 33 and the output-side deflector 27 can in this respect take place in every desired manner adapted to the respective application such that this is again shown purely schematically here. Due to the alternating magnetic fields generated in the stator 37, the rotor 33 can be precisely guided and positioned along the stator 37 by means of the guide 38 in order to make a desired correction of the transverse position of the objects 11 transported in the respective track S by means of the conveying device 13.

Whereas FIG. 2 shows two conveying devices 13, which are each associated with a track $S_1$ or $S_2$ and are each coupled to a rotor 33, and FIG. 3 merely schematically shows a conveying device 13 coupled to a rotor 33, any desired number of conveying devices 13 arranged next to one another can generally be implemented in each case and can each be coupled to a rotor 33 that is guided along the stator 37. Furthermore, a plurality of tracks S can also be associated with a common conveying device 13.

In some cases of application, it can be advantageous to provide a separate adjustment device 19 for each conveying device 13 and thus, overall, a plurality of linear motors 35 having stators 37 that extend offset in parallel from one another and that each provide a guide 38, extending in the transverse direction Q, for the respective rotor 33.

FIGS. 4a to 4f show respective possible application examples of the conveying devices 13 described that are coupled to an adjustment device 19, wherein they also relate to the embodiments with servomotors for adjusting the conveying devices 13 described in the following.

Objects 11 are respectively transported along a conveying direction R by means of conveying devices 13 and are transferred from the latter to a functional unit 17 that is connected downstream and that comprises a respective endless conveyor belt 23 in the examples shown. The conveying devices 13 in this respect each have an input-side deflector 29 and an output-side deflector 27, wherein the objects 11 are transferred at the belt transition, formed by the output-side deflector 27 of a conveying device 13 and by the input-side deflector 29 of the functional unit 17 connected downstream, by the conveying device 13 to the functional unit 17 connected downstream.

Figure 4A:
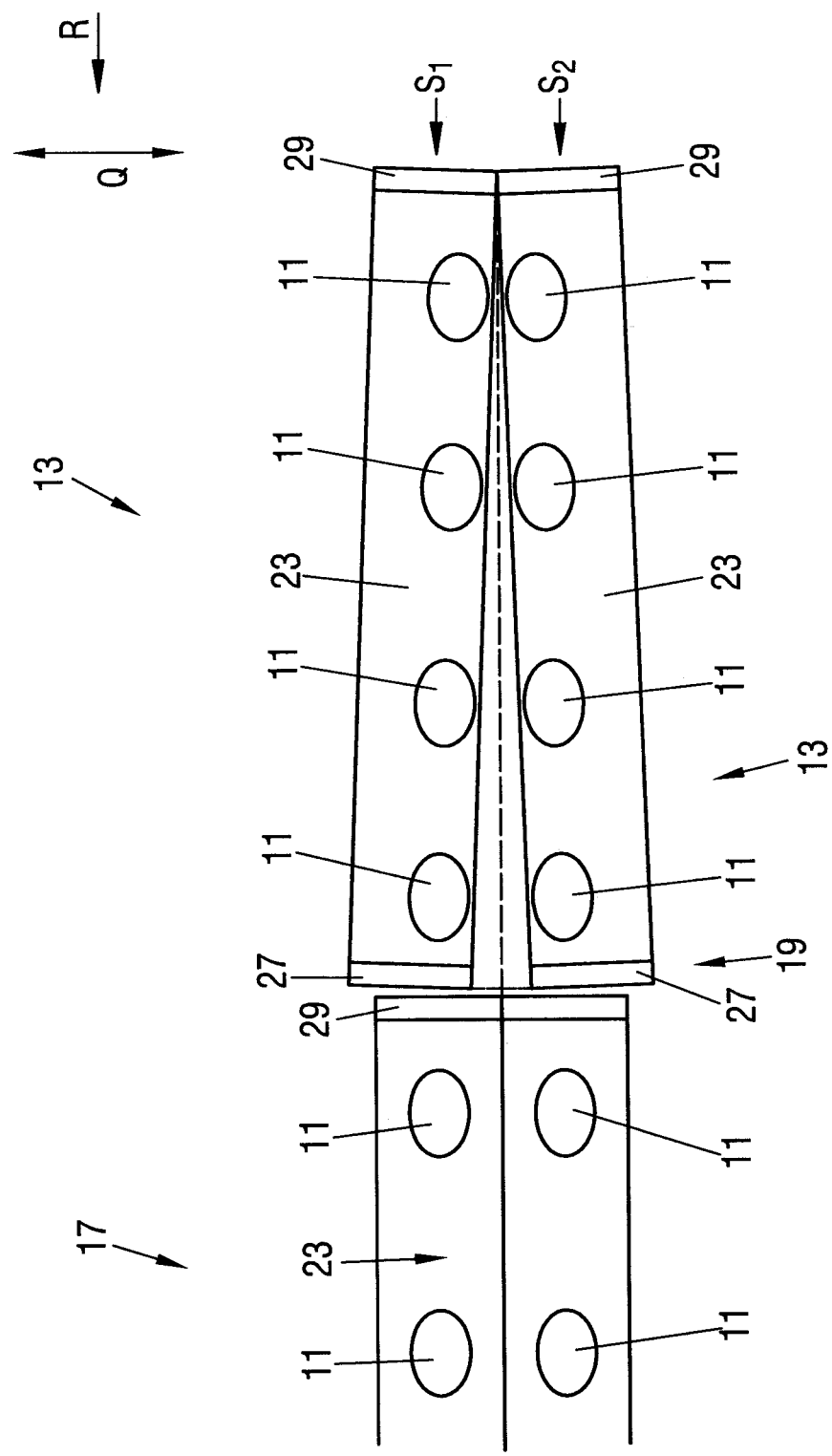

FIG. 4a shows an embodiment in accordance with the invention in which the objects 11 are transported in the conveying direction R in two tracks $S_1$ and $S_2$ by conveying devices 13 that are each associated with the tracks. The conveying devices 13 are in this respect each coupled to adjustable elements 33 of an adjustment device 19, not shown, such that the conveying devices 13 can be individually displaced in the transverse direction Q. In the example shown, the two conveying devices 13 are adjusted in the transverse direction Q with respect to their straight orientation indicated by the dotted line such that the objects 11 that are here, incorrectly, each inwardly disposed on the endless conveyor belts 23 of the conveying devices 13 are transferred in a centered manner to the functional unit 17 connected downstream. The incorrect positions of the objects within the conveying devices 13 can thus be corrected.

FIG. 4b shows a further embodiment in which two conveying devices 13 are adjusted in the transverse direction Q such that the number of tracks can be increased from two tracks $S_1$ and $S_2$ in the region of the conveying devices 13 to four tracks $S_1$ to $S_4$ at the functional unit 17 connected downstream. In this respect, the objects 11 were transferred within their tracks $S_1$ and $S_2$ along the dotted lines to the functional unit 17 connected downstream in a previous step, while the conveying devices 13 were thereupon adjusted in the transverse direction Q by means of the adjustment device 19 such that the subsequent objects 11 were transferred from their tracks $S_1$ and $S_2$ within the conveying device 13 to the tracks $S_3$ and $S_4$ of the functional unit 17 connected downstream.

Figure 4C:
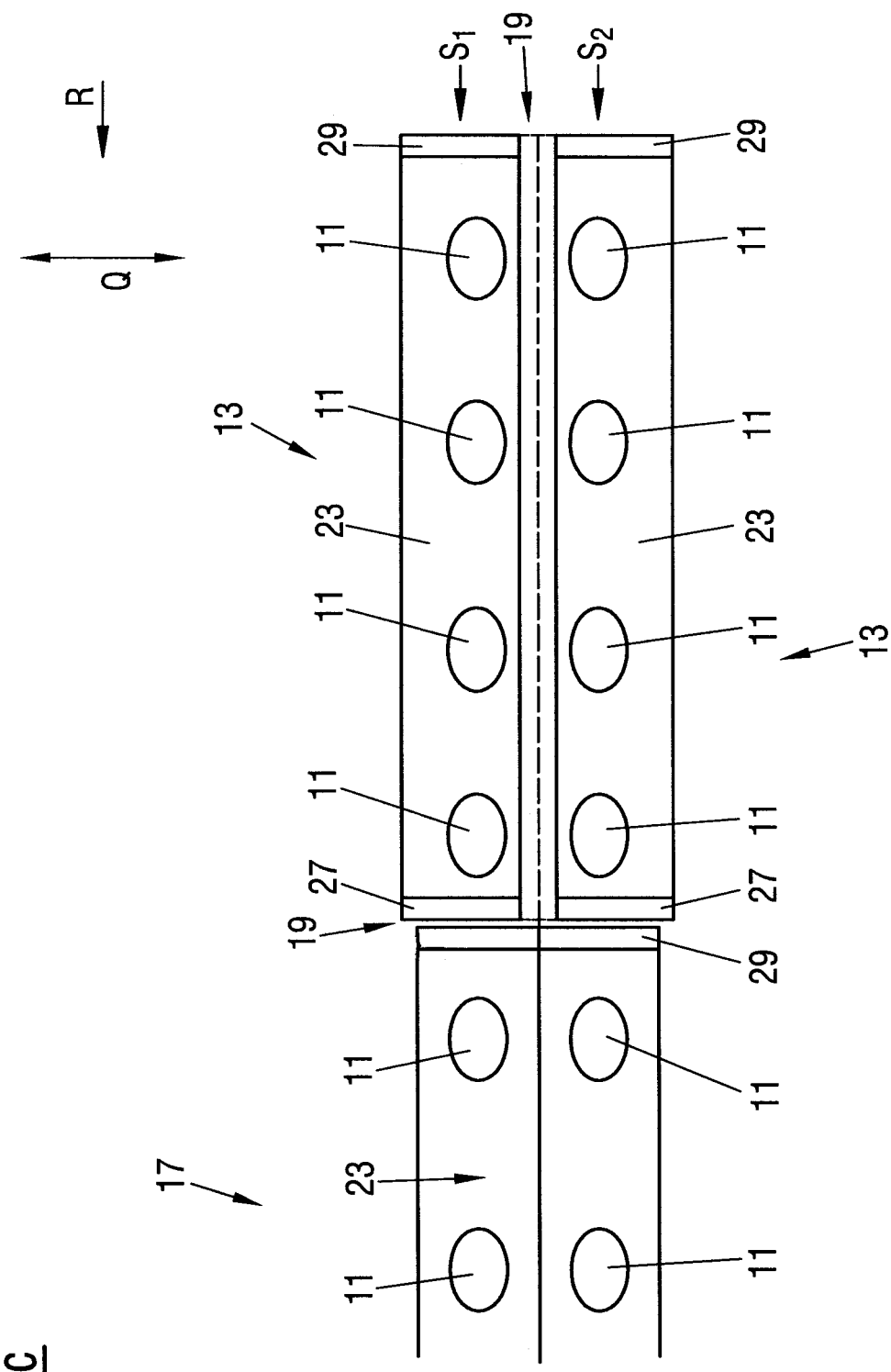

In the embodiment shown in FIG. 4c, two conveying devices 13 are adjusted by adjustment devices 19 in the transverse direction Q to the conveying direction R such that the objects 11 that are not transported centrally in their respective tracks $S_1$ and $S_2$ within the conveying devices 13 can be transferred in a centered manner within their track to the functional unit 17 connected downstream. The conveying devices 13 are here each coupled both at their output-side deflectors 27 and at their input-side deflectors 29 to movable elements 33 of the adjustment device 19 such that the conveying devices 13 can each be displaced as a whole. In this respect, it is not absolutely necessary in accordance with the invention that the transverse adjustment, as shown in FIG. 4c, takes place equally far at the input-side end and at the output-side end in each case, but transverse adjustments of respective different distances can rather also be performed.

FIG. 4d in turn shows two conveying devices 13 that are each transversely adjustable as a whole and that are here used to increase the number of tracks from two tracks $S_1$ and $S_2$ within the conveying devices 13 to four tracks $S_1$ to $S_4$ within the functional unit 17 connected downstream. As also shown in FIG. 4b, the objects 11 were in this respect first transferred within their tracks $S_1$ and $S_2$ to the functional unit 17 connected downstream in a previous step, whereas the objects are now, after the adjustment of the conveying devices 13 in the transverse direction Q, transferred from their tracks $S_1$ and $S_2$ to the tracks $S_3$ and $S_4$ of the functional unit 17 connected downstream. A further conveying device 13, to which no objects 11 are transferred from a functional unit connected upstream, not shown, in the operating situation shown, is moved to a laterally outer parking position P in order to enable maximum transverse displacements of the other conveying devices 13 that are not served by the mentioned functional unit connected upstream.

Figure 4F:
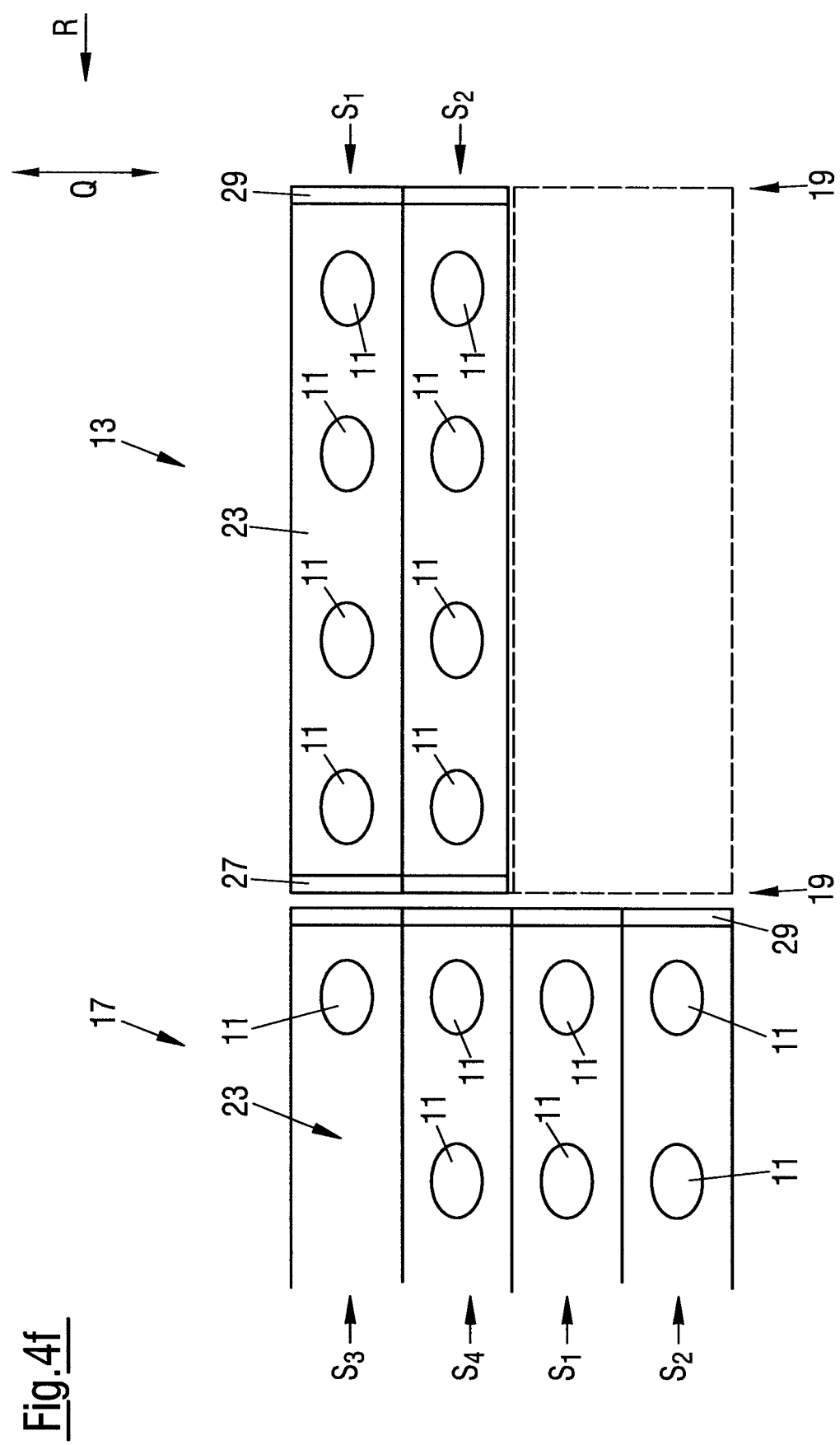

FIGS. 4e and 4f each show a conveying device 13 on which objects 11 are guided on multiple tracks. In accordance with FIG. 4e, the conveying device 13 is coupled at its output-side deflector 27 to an adjustment device 19 such that the output-side end of the conveying device 13 can be adjusted in the transverse direction Q and objects 11 that are not transported centrally in their respective track $S_1$ or $S_2$ within the conveying device 13 can be transferred in a centered manner to the functional unit 17 connected downstream within the respective track.

In FIG. 4f, the conveying device 13 is operated such that the number of tracks S from the conveying device 13 to the functional unit 17 connected downstream is increased from two tracks $S_1$ and $S_2$ to four tracks $S_1$ to $S_4$. On the other hand, in a previous step, the objects 11 were first transferred along their tracks $S_1$ and $S_2$ to the functional unit 17 connected downstream, whereupon the conveying device 13 was adjusted as a whole by an adjustment device 19, that is coupled both to the output-side deflector 27 of the conveying device 13 and to the input-side deflector 29 of the conveying device 13, such that in the step shown the objects 11 are conveyed from their tracks $S_1$ and $S_2$ within the conveying device 13 to the tracks $S_3$ and $S_4$ of the functional unit 17 connected downstream.

FIG. 5 shows a bottom view of four output-side deflectors 27 of respective conveying devices 13 that are individually adjustable in the transverse direction Q by means of an adjustment device 19. The output-side deflectors 27 are in this respect associated with respective tracks $S_1$ to $S_4$ such that objects 11 that are not shown, for example slices or portions cut off from food products by means of a high-speed slicer, can be transferred in four tracks $S_1$ to $S_4$ to a functional unit 17 connected downstream (cf. also FIG. 1). The deflectors 27 in this respect each have an upper roller 85 and a lower roller 87 via which endless conveyor means, for example a relatively wider endless conveyor belt 23 or a plurality of relatively narrower endless conveyor bands 25, can be guided. Such endless conveyor means can be driven at input-side deflectors 29 by means of respective drive motors 57 in order to also be able to operate the conveying devices 13 individually in the conveying direction R (cf. FIG. 1).

To be able to individually adjust the output-side deflectors 27 and thus the conveying devices 13 in the transverse direction Q in each of the tracks $S_1$ to $S_4$ and, for example, to be able to make corrections to the transverse position of objects 11 conveyed, the deflectors 27 are connected via couplings 61 to a respective servomotor 67 (cf. also FIG. 6 and FIGS. 7a to 7d). Each of the servomotors 67 has a cable 83 at a rear end such that the servomotors 67 are individually controllable via a control device 45 to be able to carry out any transverse adjustments of the associated conveying device 13 independently of the other conveying devices 13.

The servomotors 67 drive a respective toothed wheel 69 that rotates in a guide 38 that is configured as a gear rack 71 and that acts as a guide device 71 (cf. FIGS. 5 and 6). The toothed wheels 69 and the gear rack 71 thus form a rack and pinion gear 70 that can be acted on by the respective servomotors 67 and that is connected between the servomotors 67 and the conveying devices 13. Due to this rack and pinion gear 70, a translatory component can be obtained from a rotary movement of the toothed wheels 69, whose teeth mesh with a toothed arrangement of the gear rack 71, and a translatory movement of the servomotors 67 connected to the toothed wheels 69 and driving the toothed wheels 69 can be achieved. Accordingly, the transverse positions of the conveying devices 13, connected to the servomotors 67 via the couplings 61, or their deflectors 27 can also be individually corrected by driving the toothed wheels 69 by means of the respective servomotors 67. In this respect, the servomotors 67 form movable elements 33 of the adjustment device 19 that are coupled to the conveying devices 13.

To reliably and precisely transmit a movement of the servomotors 67 in the transverse direction to the respective conveying device 13, the servomotors 67 are connected to a respective rail-like transmission element 77 that extends in the conveying direction R and that forms a part of the coupling 61 (cf. also FIG. 6). The transmission elements 77 have a holder recess 79 at a rear end, through which a rear guide rod 81 is guided, in order to hold the transmission elements 77 and thereby the associated servomotors 67 at this rear end in a frame 89. Furthermore, the transmission elements 77 are connected at the front side to a holder roller 73 through which a front guide rod 75 of the frame 89 is guided. Due to this two-sided support of the transmission elements 77 and thus of the servomotors 67, translatory movements of the servomotors 67 can be precisely transmitted to the transmission elements 77 and thus to the couplings 61 such that an adjustment of the conveying devices 13 can be achieved without the servomotors 67 or the couplings 61 being able to cant, for example. In this respect, the servomotor 67 here forms a movable element 33 of the adjustment device 19 by means of which the associated conveying device 13 can be adjusted.

Due to the possibility of being able to set rotational positions of the respective associated toothed wheel 69 extremely precisely and quickly by means of the servomotors 67, even slight corrections of the transverse positions of the conveying devices 13 can be made exactly and, for example, between two cycles of a packaging machine 18 connected downstream.

FIGS. 7a to 7d again illustrate various possibilities of adjusting or arranging the output-side deflectors 27 of the conveying devices 13 by means of an adjustment device 19 having individually drivable servomotors 67. In addition to a correction of a transverse position of objects 11 moved by means of the conveying device 13 during operation, such an adjustment device 19 also makes it possible to orient the conveying devices 13 in a manner flexibly adapted to specific operating situations (cf. also FIGS. 4a to 4f).

Figure 7F:
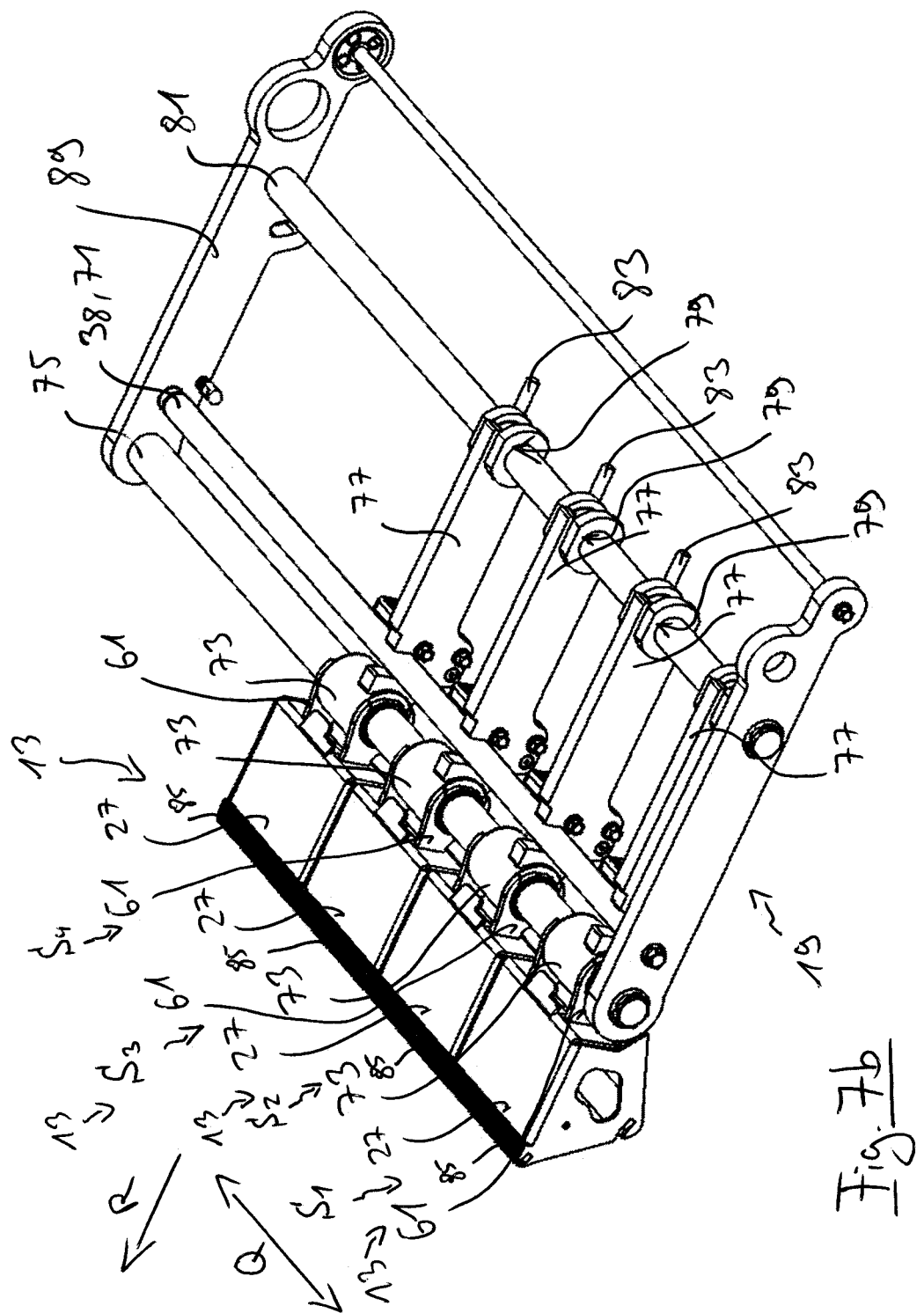

As FIG. 7a shows, the output-side deflectors 27 can, for example, be arranged centrally in the frame 89 with respect to the transverse direction Q by means of the servomotors 67. Objects 11 conveyed in the respective tracks $S_1$ to $S_4$ can in this manner, for example, be transferred in a straight line in the conveying direction R in their respective tracks S to a functional unit 17 connected downstream.

Furthermore, as FIG. 7b illustrates, the conveying devices 13 can, for example, be arranged on one side of the frame 89 with respect to the transverse direction Q in order to transfer objects 11 at this side to the functional unit 17 connected downstream. Such settings can, for example, also be provided to transfer objects 11 moving in the four tracks $S_1$ to $S_4$ to a functional unit 17 connected downstream comprising eight tracks S, for example, similar to the versions illustrated in FIGS. 4b, 4d and 4f of a change from two tracks $S_1$ and $S_2$ to four tracks $S_1$ to $S_4$.

Provision can further be made to move the conveying device 13 of a track $S_4$ that is currently not used into a parking position P and to only carry out the operation in the tracks $S_1$ to $S_3$ (cf. FIGS. 7c and 4d). The conveying path can thereby be flexibly set to specific operating situations and to a respective currently used number of tracks S, for example, in order to convey slices cut off from food products by means of a high-speed slicer without a conversion of the conveying path F being necessary for this purpose.

Furthermore, provision can be made to arrange the conveying devices 13 or their output-side deflectors 27 in the transverse direction Q uniformly spaced apart from one another in order, for example, to be able to transfer transported objects 11 at the largest possible spacing from one another with respect to the transverse direction Q to a functional unit 17 connected downstream (cf. FIG. 7d).

The conveying device 13 in accordance with the invention thus provides numerous possibilities of use and can be used for a large number of applications, wherein in particular the possibility of slight and precisely controllable transverse displacements for correcting the position of objects 11 within their track S can serve to ensure the accuracy of the transfer of the objects 11 to functional units 17 connected downstream and in particular the precise insertion of the objects into packaging spaces 49 provided for this purpose or into recesses 53 at a material web 51 of a packaging machine 18.

REFERENCE NUMERAL LIST 11 object, food portion
A conveying device
15 high-speed slicer
17 functional unit connected downstream
18 packaging machine
19 adjustment device
23 endless conveyor belt
25 endless conveyor band
27 output-side deflector
29 input-side deflector
33 movable element, rotor
35 linear motor
37 stator
38 guide
39 controlling device
43 sensor, image recording device
45 control device
47 feeder
49 packaging space
51 material web
53 recess
55 portioning belt
57 drive motor
59 support of the deflection rollers
61 coupling
63 buffer
65 rocker
67 servomotor
69 adjustment element, toothed wheel
70 rack and pinion gear
71 guide device, gear rack
73 holder roller
75 front guide rod
77 transfer rail
79 holder recess
81 rear guide rod
83 cable
85 upper roller
87 lower roller
89 frame
A work path
F conveying path
P parking position
Q transverse direction
R conveying direction
S track

The invention claimed is:

1. An apparatus for the single-track or multi-track conveying of objects along a conveying path extending in a conveying direction, wherein the conveying path for at least one track comprises at least one conveying device, the conveying device taking over objects at an input side from a functional unit connected upstream and the conveying device transferring objects at an output side to a functional unit connected downstream; and wherein the conveying device as a whole and/or in an output-side end region is adjustable transversely to the conveying direction by means of an adjustment device such that a transverse position of objects to be transferred is changed within the respective track, wherein the adjustment device comprises a servomotor for adjusting the conveying device that is coupled to the conveying device, wherein the servomotor is movable together with the conveying device in the transverse direction.

2. The apparatus in accordance with claim 1, wherein the conveying path is of multi-track design and comprises a conveying device for each track, with the conveying devices of each track being arranged next to one another and being adjustable independently of one another in a transverse direction.

3. The apparatus in accordance with claim 1, wherein the conveying device comprises a revolving endless conveyor means, with an output-side deflector for the endless conveyor means being adjustable in the transverse direction by means of the adjustment device.

4. The apparatus in accordance with claim 1, wherein a rack and pinion gear that can be acted on by means of the servomotor is connected between the servomotor and the conveying device.

5. The apparatus in accordance with claim 1, wherein the servomotor is configured to drive an adjustment element in a rotational manner, with the adjustment element being guided in a guide device that is configured to convert a rotary movement of the adjustment element into a translatory movement of the servomotor and of the conveying device coupled thereto transversely to the conveying direction.

6. The apparatus in accordance with claim 5, wherein the adjustment element is configured as a toothed wheel that revolves in a gear rack extending transversely to the conveying direction.

7. The apparatus in accordance with claim 1, wherein the conveying path is of multi-track design and the adjustment device comprises a servomotor for each track.

8. An apparatus for the single-track or multi-track conveying of objects along a conveying path extending in a conveying direction, wherein the conveying path for at least one track comprises at least one conveying device, the conveying device taking over objects at an input side from a functional unit connected upstream and the conveying device transferring objects at an output side to a functional unit connected downstream; wherein the conveying device as a whole and/or in an output-side end region is adjustable transversely to the conveying direction by means of an adjustment device such that a transverse position of objects to be transferred is changed within the respective track, wherein the adjustment device comprises a servomotor for adjusting the conveying device that is coupled to the conveying device; and wherein a rack and pinion gear that can be acted on by means of the servomotor is connected between the servomotor and the conveying device.

9. The apparatus in accordance with claim 8, wherein the servomotor is configured to drive an adjustment element in a rotational manner, with the adjustment element being guided in a guide device that is configured to convert a rotary movement of the adjustment element into a translatory movement of the servomotor and of the conveying device coupled thereto transversely to the conveying direction.

10. The apparatus in accordance with claim 9, wherein the adjustment element is configured as a toothed wheel that revolves in a gear rack extending transversely to the conveying direction.

11. The apparatus in accordance with claim 8, wherein the conveying path is of multi-track design and the adjustment device comprises a servomotor for each track.

12. The apparatus in accordance with claim 8, wherein the conveying path is of multi-track design and comprises a conveying device for each track, with the conveying devices of each track being arranged next to one another and being adjustable independently of one another in a transverse direction.

13. The apparatus in accordance with claim 8, wherein the conveying device comprises a revolving endless conveyor means, with an output-side deflector for the endless conveyor means being adjustable in the transverse direction by means of the adjustment device.

14. An apparatus for the single-track or multi-track conveying of objects along a conveying path extending in a conveying direction, wherein the conveying path for at least one track comprises at least one conveying device, the conveying device taking over objects at an input side from a functional unit connected upstream and the conveying device transferring objects at an output side to a functional unit connected downstream; wherein the conveying device as a whole and/or in an output-side end region is adjustable transversely to the conveying direction by means of an adjustment device such that a transverse position of objects to be transferred is changed within the respective track; and wherein a controlling device is provided that is configured to detect the transverse position of objects on the conveying device and/or on a functional unit connected upstream of the conveying device and/or on a functional unit connected downstream of the conveying device.

15. The apparatus in accordance with claim 14, wherein the conveying path is of multi-track design and comprises a conveying device for each track, with the conveying device of each track being arranged next to one another and being adjustable independently of one another in a transverse direction.

16. The apparatus in accordance with claim 14, wherein the conveying device comprises a revolving endless conveyor means, with an output-side deflector for the endless conveyor means being adjustable in the transverse direction by means of the adjustment device.

17. The apparatus in accordance with claim 14, wherein the adjustment device comprises a movable element that is coupled to the conveying device.

18. The apparatus in accordance with claim 17, wherein the movable element of the adjustment device is configured as a rotor of a linear motor.

19. The apparatus in accordance with claim 17, wherein the movable element is drivable by means of a servomotor and/or comprises a servomotor.

20. The apparatus in accordance with claim 14, wherein the controlling device comprises at least one sensor that is arranged in a region of the conveying device or in a region of the functional unit and that determines information on the transverse positions of the objects within the track.

21. The apparatus in accordance with claim 14, wherein the controlling device comprises an image recording device, by means of which a position of objects within a track and/or simultaneously within a plurality of tracks can be determined.

22. The apparatus in accordance with claim 14, wherein the controlling device comprises a plurality of sensors that are arranged distributed along the conveying path to determine a position of objects at different locations.

23. The apparatus in accordance with claim 14, wherein a control device is provided that is configured to adjust the conveying device in the transverse direction by means of the adjustment device in dependence on the transverse positions of the objects detected by means of the controlling device.

24. The apparatus in accordance with claim 23, wherein the control device is configured to change a conveying speed of the conveying device in order to correct a longitudinal position of the objects to be transferred.

25. The apparatus in accordance with claim 14,
wherein the adjustment device comprises a servomotor for adjusting the conveying device that is coupled to the conveying device.

26. The apparatus in accordance with claim 25,
wherein a rack and pinion gear that can be acted on by means of the servomotor is connected between the servomotor and the conveying device.

27. The apparatus in accordance with claim 25,
wherein the servomotor is configured to drive an adjustment element in a rotational manner, with the adjustment element being guided in a guide device that is configured to convert a rotary movement of the adjustment element into a translatory movement of the servomotor and of the conveying device coupled thereto transversely to the conveying direction.

28. The apparatus in accordance with claim 27,
wherein the adjustment element is configured as a toothed wheel that revolves in a gear rack extending transversely to the conveying direction.

29. The apparatus in accordance with claim 14,
wherein the conveying path is of multi-track design and the adjustment device comprises a servomotor for each track.

30. The apparatus in accordance with claim 14,
wherein the adjustment device comprises a linear motor having a stator and having a rotor coupled to the conveying device.

31. The apparatus in accordance with claim 14, wherein the conveying path is of multi-track design and the adjustment device comprises a linear motor for each track.

32. The apparatus in accordance with claim 14, wherein the conveying path is of multi-track design and the adjustment device comprises a common linear motor for all the tracks that comprises a rotor for each track.

33. The apparatus in accordance with claim 32, wherein the common linear motor comprises a common stator for the rotors which extends in the transverse direction over all the tracks and at which the rotors, which are each associated with one of the tracks, are guided during their respective adjustment movement.

34. The apparatus in accordance with claim 32, wherein the common linear motor comprises a common stator for all the rotors and is controllable such that the rotors are movable independently of one another along the stator.

35. A device for handling objects along a work path, the device comprising an apparatus for the single-track or multi-track conveying of objects along a conveying path extending in a conveying direction, wherein the conveying path for at least one track comprises at least one conveying device, the conveying device taking over objects at an input side from a functional unit connected upstream and the conveying device transferring objects at an output side to a functional unit connected downstream; and wherein the conveying device as a whole and/or in an output-side end region is adjustable transversely to the conveying direction by means of an adjustment device such that a transverse position of objects to be transferred is changed within the respective track, with the conveying path comprising the at least one conveying device and forming a part of the work path; a controlling device that is configured to detect the transverse position of objects on the conveying device or on a functional unit connected upstream or connected downstream of the conveying device; and a control device that is configured to adjust the conveying device in the transverse direction in the case of a deviation of the detected transverse position from a desired transverse position in order to correct the transverse position of objects to be transferred within the respective track.

36. The device in accordance with claim 35, wherein the work path comprises a packaging machine (that is at least partly arranged downstream of the conveying path.

37. The device in accordance with claim 36, wherein the conveying device or a functional unit connected downstream of the conveying device is configured to transfer the objects from the conveying path to respective associated packaging spaces of the packaging machine.

38. The device in accordance with claim 37, wherein the controlling device is configured to detect a position of the objects at the packaging spaces.

39. A method of handling objects along a work path using one of an apparatus and a device, the apparatus being for the single-track or multi-track conveying of objects along a conveying path extending in a conveying direction, wherein the conveying path for at least one track comprises at least one conveying device, the conveying device taking over objects at an input side from a functional unit connected upstream and the conveying device transferring objects at an output side to a functional unit connected downstream; and wherein the conveying device as a whole and/or in an output-side end region is adjustable transversely to the conveying direction by means of an adjustment device such that a transverse position of objects to be transferred is changed within the respective track, the device being for handling objects along a work path, the device comprising an apparatus for the single-track or multi-track conveying of objects along a conveying path extending in a conveying direction, wherein the conveying path for at least one track comprises at least one conveying device, the conveying device taking over objects at an input side from a functional unit connected upstream and the conveying device transferring objects at an output side to a functional unit connected downstream; and wherein the conveying device as a whole and/or in an output-side end region is adjustable transversely to the conveying direction by means of an adjustment device such that a transverse position of objects to be transferred is changed within the respective track, with the conveying path comprising the at least one conveying device and forming a part of the work path; a controlling device that is configured to detect the transverse position of objects on the conveying device or on a functional unit connected upstream or connected downstream of the conveying device; and a control device that is configured to adjust the conveying device in the transverse direction in the case of a deviation of the detected transverse position from a desired transverse position in order to correct the transverse position of objects to be transferred within the respective track, in which method the transverse position of objects on the conveying device and/or on a functional unit connected upstream of the conveying device and/or connected downstream of the conveying device is detected; and the conveying device is adjusted in the transverse direction in the case of a deviation of the detected transverse position from a predefined or predefinable desired transverse position in order to correct the transverse position of the objects to be transferred within the respective track.

40. The method in accordance with claim 39, wherein the control device is configured to carry out a trend regulation when the transverse positions of the objects are corrected.

41. A method of adjusting at least one conveying device transversely to a conveying direction using one or more adjustment devices, the conveying device conveying objects along a single-track or multi-track conveying path extending in the conveying direction, wherein the adjustment device comprises a guide extending in the transverse direction and at least one element, the at least one element being associated with the conveying device, the at least one element being movable in a controlled manner along the guide in the transverse direction by means of a control device, and the at least one element being coupled to the conveying device; and the method comprising the step of changing a transverse position of the objects to be transferred by moving the at least one element along the guide, wherein the conveying device is adjusted to correct the transverse position of the objects to be transferred within the respective track, or, to move into a parking position in order to change the number of tracks.

42. The method in accordance with claim 41, wherein the adjustment device comprises a servomotor that forms the movable element and that drives a toothed wheel in a rotational manner, said toothed wheel revolving in a gear rack extending in the transverse direction; or wherein the adjustment device comprises a linear motor whose stator forms the guide, and wherein the movable element is configured as a rotor of the linear motor; or wherein the adjustment device comprises a spindle drive whose threaded spindle forms the guide and the movable element is configured as a spindle nut of the spindle drive.

* * * * *

UNITED STATES PATENT AND TRADEMARK OFFICE
CERTIFICATE OF CORRECTION

| | | |
|---|---|---|
| PATENT NO. | : 11,685,608 B2 | Page 1 of 1 |
| APPLICATION NO. | : 16/832835 | |
| DATED | : June 27, 2023 | |
| INVENTOR(S) | : Jens Schroder | |

It is certified that error appears in the above-identified patent and that said Letters Patent is hereby corrected as shown below:

On the Title Page

Insert: -- (30) Foreign Application Priority Data
Mar. 28, 2019 (DE) ......................................... 102019108126.2 --

Signed and Sealed this
Thirty-first Day of October, 2023

*Katherine Kelly Vidal*
Katherine Kelly Vidal
*Director of the United States Patent and Trademark Office*